United States Patent
Senzaki

(10) Patent No.: US 11,120,295 B2
(45) Date of Patent: Sep. 14, 2021

(54) PATTERN GENERATION DEVICE, IMAGE PROCESSING DEVICE, PATTERN GENERATION METHOD, AND STORAGE MEDIUM ON WHICH PROGRAM IS STORED

(71) Applicant: NEC Corporation, Tokyo (JP)

(72) Inventor: Kenta Senzaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 155 days.

(21) Appl. No.: 16/474,128

(22) PCT Filed: Jan. 6, 2017

(86) PCT No.: PCT/JP2017/000204
§ 371 (c)(1),
(2) Date: Jun. 27, 2019

(87) PCT Pub. No.: WO2018/127963
PCT Pub. Date: Jul. 12, 2018

(65) Prior Publication Data
US 2019/0354798 A1    Nov. 21, 2019

(51) Int. Cl.
*G06K 9/62* (2006.01)
*G06T 5/00* (2006.01)
*G06T 5/10* (2006.01)

(52) U.S. Cl.
CPC .......... *G06K 9/6212* (2013.01); *G06T 5/002* (2013.01); *G06T 5/10* (2013.01); *G06T 2207/20052* (2013.01)

(58) Field of Classification Search
CPC ........ G06K 9/6212; G06K 9/522; G06K 9/40; G06T 5/002; G06T 5/10; G06T 2207/20052; H04N 1/41
See application file for complete search history.

(56) References Cited

U.S. PATENT DOCUMENTS 4,288,816 A * 9/1981 Kashioka ................. G06K 9/36
  382/232
5,416,851 A * 5/1995 Huttenlocher ........... G06K 9/50
  382/196

(Continued)

FOREIGN PATENT DOCUMENTS

JP    6-133287 A    5/1994
JP    2006-165930 A    6/2006
JP    2010-39662 A    2/2010

OTHER PUBLICATIONS

International Search Report on International Application No. PCT/JP2017/000204, dated Mar. 21, 2017.

(Continued)

*Primary Examiner* — Aaron W Carter
(74) *Attorney, Agent, or Firm* — Sughrue Mion, PLLC

(57) ABSTRACT

Provided is a pattern generation device for generating a sampling pattern that could make it possible to improve the efficiency of image processing, including the processing of sampled blocks. A pattern generation device as in one embodiment of the present invention is provided with: a main generating means for generating a sampling pattern which is a pattern of positions of sampling points in an image, the sampling points indicating blocks to be used in image processing of the respective blocks, and the sampling pattern generated so that the numbers of sampling points in a plurality of rows in the sampling pattern are each equal to a reference value; and an output control means for performing a control for outputting a main sampling pattern, which is the sampling pattern generated by the main generating means.

12 Claims, 19 Drawing Sheets

(56) References Cited

U.S. PATENT DOCUMENTS

| | | | | |
|---|---|---|---|---|
| 6,255,968 | B1* | 7/2001 | Kitagawa | H03M 7/30 341/87 |
| 2004/0228539 | A1* | 11/2004 | Fujishiro | H05K 3/361 382/240 |
| 2009/0129703 | A1* | 5/2009 | Takeshima | H04N 19/59 382/299 |
| 2012/0147226 | A1* | 6/2012 | Takatori | H04N 5/367 348/246 |
| 2015/0170340 | A1* | 6/2015 | Sato | H04N 5/23229 348/322 |
| 2015/0304556 | A1* | 10/2015 | Sato | H04N 5/347 348/222.1 |
| 2018/0048896 | A1* | 2/2018 | Park | H04N 19/117 |
| 2018/0084280 | A1* | 3/2018 | Thiagarajan | H04N 19/61 |
| 2019/0354798 | A1* | 11/2019 | Senzaki | G06T 5/10 |
| 2020/0204777 | A1* | 6/2020 | Goldman | G06T 7/11 |
| 2020/0294280 | A1* | 9/2020 | Ding | G01R 33/4818 |
| 2020/0311875 | A1* | 10/2020 | Senzaki | G06T 5/10 |

OTHER PUBLICATIONS

Written Opinion in International Application No. PCT/JP2017/000204, dated Mar. 21, 2017.

Takashi Komatsu et al., "Super-Resolution Decoding of JPEG-Compressed Image Data with the Shrinkage in the Redundant DCT Domain", IEEE, 28th Picture Coding Symposium, PCS2010, Dec. 8-10, 2010, Nagoya, Japan, pp. 114-117 (4 pages total).

Shu Fujita et al., "Randomized Redundant DCT: Efficient Denoising by Using Random Subsampling of DCT Patches", Proceeding SA'15 SIGGRAPH Asia 2015 Technical Briefs, Nov. 2015, No. 7 (4 pages total).

Robert L. Cook, "Stochastic Sampling in Computer Graphics", ACM Transactions on Graphics, Jan. 1986, vol. 5, No. 1, pp. 51-72 (22 pages total).

Shu Fujita et al., "Basical Study on Randomized Redundant DCT for Efficient Denoising", IEICE Technical Report, Nov. 26, 2015, vol. 115, No. 349, pp. 39-44 (6 pages total).

* cited by examiner

PATTERN GENERATION DEVICE, IMAGE PROCESSING DEVICE, PATTERN GENERATION METHOD, AND STORAGE MEDIUM ON WHICH PROGRAM IS STORED

This application is a National Stage Entry of PCT/JP2017/000204 filed on Jan. 6, 2017, the contents of all of which are incorporated herein by reference, in their entirety.

TECHNICAL FIELD

The present disclosure relates to image processing.

BACKGROUND ART

Among image processing techniques, a technique for reducing noise included in an image is an important technique for not only reproducing a captured image more vividly, but also preventing enhancement of noise in processing of various types of image enhancement.

Examples of noise included in an image include Additive White Gaussian Noise, Poisson noise, and the like, for example.

A technique for reducing noise include a technique called redundant discrete cosine transform (RDCT) using a discrete cosine transform (DCT) as indicated in NPL 1, for example. The RDCT is a technique for acquiring an image having noise being removed, by correcting a DCT coefficient acquired by the DCT in block units (block DCT), and further performing inverse DCT (IDCT) on the corrected DCT coefficient. The correction on the DCT coefficient is performed by applying, for example, soft shrinkage or hard shrinkage to the DCT coefficient. In the hard shrinkage, for example, assuming that a DCT coefficient in a position (i, j) of a pixel in a block to be processed is f(i, j), a corrected DCT coefficient f'(i, j) is derived as follows by using a threshold value processing parameter $\tau$.

[Equation 1]

$$f'(i, j) = \begin{cases} f(i, j) & |f(i, j)| > \tau \text{ or } (i, j) = (0, 0) \\ 0 & \text{otherwise} \end{cases} \quad (1)$$

Note that a DCT coefficient in a position (0, 0) is a direct-current component, and thus correction is not performed.

When noise included in an input image is white random gaussian noise, a component of the noise generally spreads to all transform coefficients after the DCT. On the other hand, an image signal (original signal) without noise tends to have energy being concentrated on a specific frequency component after the DCT, according to a sparse representation theory of the image signal. In other words, the original signal can be represented by transform coefficients of relatively few kinds. Based on the above-described property, the processing of an equation (1) is processing of removing noise by removing a DCT coefficient having a small absolute value, and maintaining an original signal component by maintaining a DCT coefficient having a great absolute value.

In a block DCT in joint photographic experts group (JPEG) and the like, for example, entire image is divided into blocks of 8 pixels×8 pixels, and processing is performed in block units. At this time, the blocks are disposed in such a way as not to overlap each other. In the RDCT, an image is similarly processed in block units, but blocks are allowed to overlap each other. For example, in the example of the blocks of 8 pixels×8 pixels, there are 8×8=64 patterns of the blocks including one specific pixel. The RDCT generates a normalized output pixel value by taking an average value of pixel values generated in each block pattern.

The RDCT is particularly excellent in representing an image signal in which energy is more likely to be biased toward a specific frequency component, such as a texture having a repetitive pattern, and is a technique capable of achieving noise removal with high quality.

Note that examples of frequency transform used in such a technique of noise removal include Hadamard transform, Wavelet transform, and the like, in addition to the DCT.

However, the RDCT calculates one pixel with a different block division pattern by maximum redundancy, and thus a calculation cost is high. Note that the maximum redundancy represents the number of patterns of blocks including one pixel. When a size of blocks is 8 pixels×8 pixels, maximum redundancy is 64.

Randomized RDCT (RRDCT) in NPL 2 is proposed as a method of reducing a calculation cost.

The RRDCT performs the RDCT by using a block that is randomly sampled (extracted) from patterns of all blocks, instead of performing the RDCT by using patterns of all blocks. However, random sampling has a possibility of presence of a pixel that is nor processed even once. Thus, sampling having spatially moderate variations is performed by using Poisson Disk Sampling (PDS) in NPL 3, for example.

The PDS is one of methods of determining arrangement (pattern) of a representative point (hereinafter referred to as a "sampling point") in a block indicating a position of the block to be sampled. For a certain pixel position being randomly determined, when another sampling point is located within a predetermined radius from the pixel position, the method of the PDS does not sample the pixel. When another sampling point is not located within a predetermined radius from the pixel position, the method of the PDS samples the pixel. The method of the PDS repeats such processing until a point that can be sampled is not present, and calculates a final sampling pattern.

When a radius shorter than half a length of one side of a block size of the RDCT is set as the predetermined radius in the PDS, all pixels are always included in any of blocks. Further, all pixels are substantially equal in redundancy per one pixel, and thus performance of noise removal for each pixel does not greatly vary spatially.

NPL 2 describes that the RRDCT can reduce a calculation cost while maintaining the performance of the RDCT. Note that the PDS has a high calculation cost, but a load of calculation is practically reduced by, for example, preparing a plurality of sampling patterns of blocks and using the patterns while switching appropriately. Therefore, there is practically a minimal problem in terms of the amount of calculation due to use of the PDS in the RRDCT.

CITATION LIST

Non Patent Literature

[NPL 1] T. Komatsu, Y. Ueda, and T. Saito, "Super-resolution decoding of JPEG-compressed image data with the shrinkage in the redundant DCT domain," Picture Coding Symposium (PCS), December 2010, pp. 114-117.

[NPL 2] S. Fujita, N. Fukushima, M. Kimura, and Y. Ishibashi, "Randomized Redundant DCT: Efficient Denoising by Using Random Subsampling of DCT Patches," SIGGRAPH Asia 2015 Technical Briefs, November 2015.

[NPL 3] Robert L. Cook, "Stochastic Sampling in Computer Graphics," ACM Transactions on Graphics, Vol. 5, No. 1, January 1986, pp. 51-72.

SUMMARY OF INVENTION

Technical Problem

Since a position in which a block is sampled is randomly selected in the PDS, the number of sampling points (hereinafter referred to as "a sample number") per one line (row) varies from line to line. Particularly, when the above-described predetermined radius (hereinafter referred to as a "set radius") set in the PDS is great, that is, when the number of final sampling points is small, a sample number in each line is more likely to become uneven. Accordingly, throughput per one line varies from line to line in the RRDCT. For this reason, for example, when hardware implementation of field-programmable gate array (FPGA) that performs processing on each line in parallel and the like is conducted, a delay needs to be generated in the other line in agreement with a line having maximum throughput, in order to synthesize processing on each line. Thus, there is a problem that the hardware implementation becomes complicated and efficiency of the processing is reduced.

Thus, the present invention has been made in view of the above-described problem, and one of objects thereof is to provide a pattern generation device that generates a sampling pattern that may improve efficiency of image processing including processing on a sampled block.

Solution to Problem

A pattern generation device according to one example embodiment of the present invention includes a main generating means for generating a sampling pattern being a pattern of a position in an image of a sampling point indicating a block used in image processing for each block, in such a way that the number of sampling points in a plurality of rows in the sampling pattern is each equal to a reference value, and an output control means for performing control in such a way as to output a main sampling pattern being a sampling pattern generated by the main generating means.

A pattern generation method according to one example embodiment of the present invention includes generating a sampling pattern being a pattern of a position in an image of a sampling point indicating a block used in image processing for each block, in such a way that the number of sampling points in a plurality of rows in the sampling pattern is each equal to a reference value, and performing control in such a way as to output a main sampling pattern being the generated sampling pattern.

A program according to one example embodiment of the present invention causes a computer to execute main generating processing of generating a sampling pattern being a pattern of a position in an image of a sampling point indicating a block used in image processing for each block, in such a way that the number of sampling points in a plurality of rows in the sampling pattern is each equal to a reference value, and output control processing of performing control in such a way as to output a main sampling pattern being a sampling pattern generated by the main generating processing.

A storage medium according to one example embodiment of the present invention stores the above-described program.

An image processing device according to one example embodiment of the present invention includes an image processing means for generating a new image by performing image processing for each block, based on the above-described main sampling pattern.

Advantageous Effects of Invention

According to the present invention, a sampling pattern that may improve efficiency of image processing including processing on a sampled block is able to be acquired.

EXAMPLE EMBODIMENT

Hereinafter, example embodiments of the present invention will be described in detail with reference to drawings.

First Example Embodiment

First, a first example embodiment of the present invention is described.

<Configuration>

Figure 1:
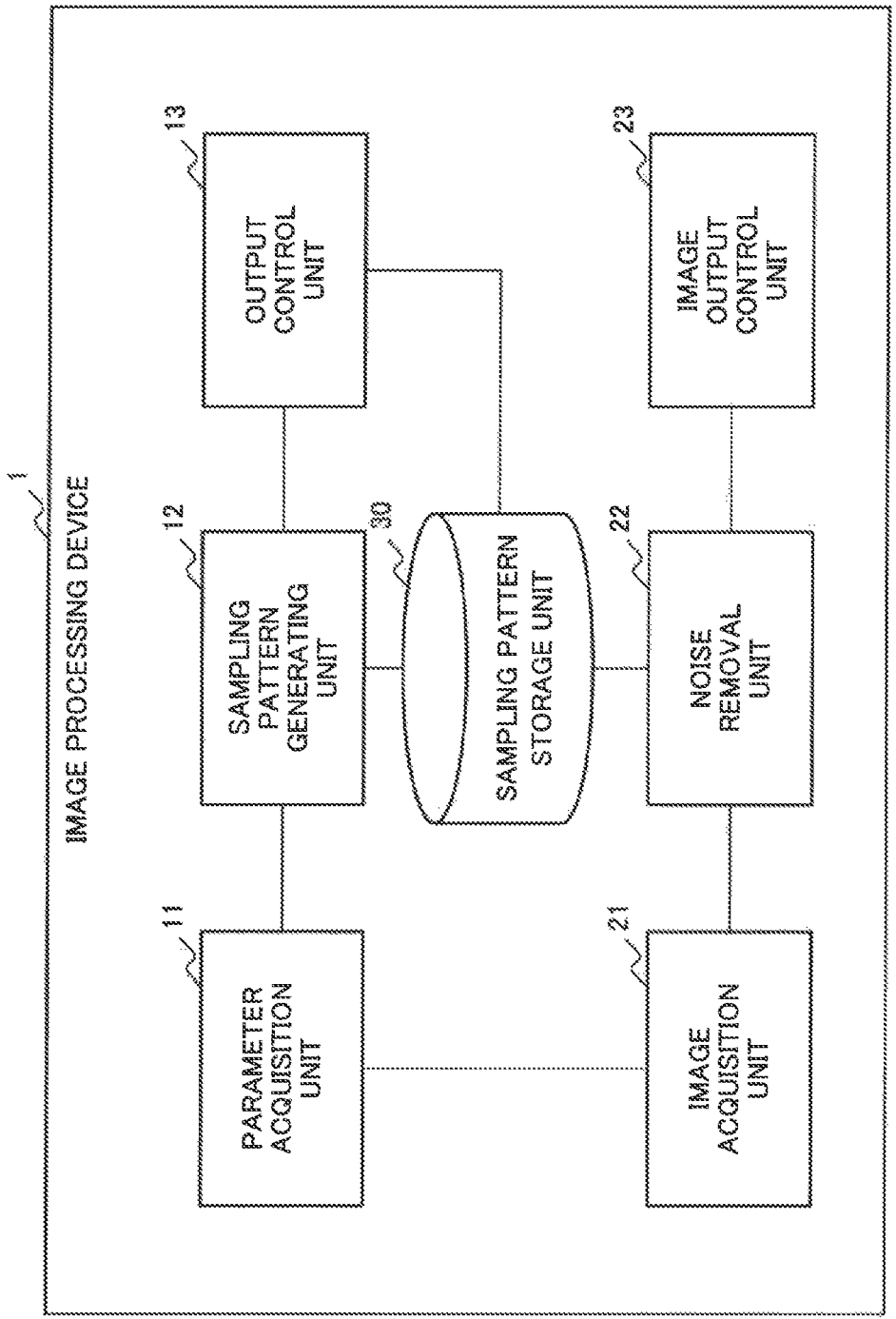
FIG. 1 is a block diagram illustrating a configuration of an image processing device according to a first example embodiment of the present invention.

FIG. 1 is a block diagram illustrating a configuration of an image processing device 1 according to the first example embodiment of the present invention. The image processing device 1 includes a parameter acquisition unit 11, a sampling pattern generating unit 12, an output control unit 13, an image acquisition unit 21, a noise removal unit 22, an image output control unit 23, and a sampling pattern storage unit 30.

The parameter acquisition unit 11 acquires a parameter used for generation of a sampling pattern, and outputs the acquired parameter to the sampling pattern generating unit 12. The parameter acquisition unit 11 includes an input interface such as a keyboard and a button, for example, and accepts an input of a parameter from a user. The parameter acquisition unit 11 may be connected to an input apparatus, and may acquire a parameter by receiving an input operation of a parameter on the input apparatus by a user, from the input apparatus. Alternatively, the parameter acquisition unit 11 may acquire a parameter from a file that holds the parameter. A parameter used for the generation of a sampling pattern will be described later.

The sampling pattern generating unit 12 generates a sampling pattern of a DCT block used by the noise removal unit 22 described later, based on the parameter acquired by the parameter acquisition unit 11. Then, the sampling pattern generating unit 12 outputs the generated sampling pattern to the sampling pattern storage unit 30 and the output control unit 13.

The output control unit 13 performs control of outputting of data such as a result and progress of processing by the image processing device 1. The output control unit 13 is connected to an output device (not illustrated) that outputs an image, such as a display and a printer, for example, and outputs data to the output device. The output control unit 13 may output image data to a storage medium connected to the image processing device 1. The output control unit 13 may transmit data to another device connected via a network.

The image acquisition unit 21 acquires image data to be processed. The image acquisition unit 21 acquires image data by receiving the image data from a device having a capturing function, such as a camera and a scanner, for example, in a wireless or wired manner. The image acquisition unit 21 may acquire image data by reading the image data from a storage medium that stores the image data. The image acquisition unit 21 may acquire image data, via a communication network and the like, from an image database in which the image data are accumulated. The image acquisition unit 21 outputs the acquired image data to the noise removal unit 22. Hereinafter, an image acquired as an image to be processed is also referred to as an "input image".

The noise removal unit 22 performs denoise processing on an input image, and outputs the image having noise being removed to the image output control unit 23.

The image output control unit 23 performs control of an output of an image generated by the noise removal unit 22. The image output control unit 23 is connected to an output device (not illustrated) that outputs an image, such as a display and a printer, for example, and outputs data to the output device. The image output control unit 23 may output image data to a storage medium connected to the image processing device 1. The image output control unit 23 may transmit data to another device connected via a network.

===Sampling Pattern Generating Unit 12===

Figure 2:
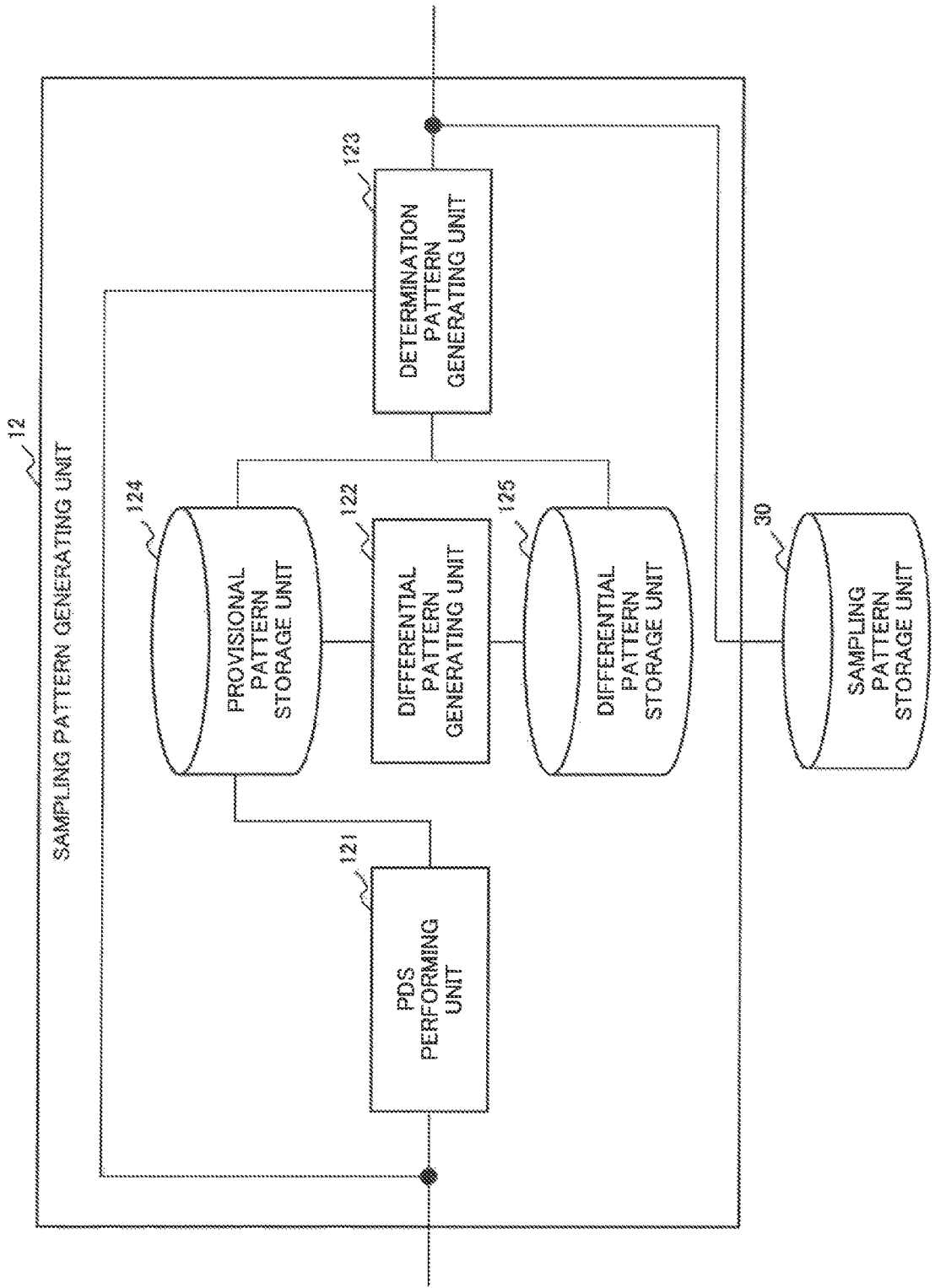
FIG. 2 is a block diagram illustrating a configuration of a sampling pattern generating unit in the first example embodiment.

FIG. 2 is a block diagram illustrating a configuration of the sampling pattern generating unit 12. The sampling pattern generating unit 12 includes a PDS performing unit 121, a differential pattern generating unit 122, a determination pattern generating unit 123, a provisional pattern storage unit 124, and a differential pattern storage unit 125.

The PDS performing unit 121 performs PDS for a plurality of times while changing a set radius, based on a parameter acquired by the parameter acquisition unit 11. Then, the PDS performing unit 121 stores each sampling pattern acquired by the PDS based on each set radius as a "provisional pattern" in the provisional pattern storage unit 124. Details of the provisional pattern will be described later.

The provisional pattern storage unit 124 stores the provisional pattern, based on each set radius, generated by the PDS performing unit 121. The provisional pattern storage unit 124 outputs the provisional pattern according to an instruction from the differential pattern generating unit 122 and the determination pattern generating unit 123.

The differential pattern generating unit 122 calculates a difference between provisional patterns, based on different set radii, as a "differential pattern", and outputs the calculated differential pattern to the differential pattern storage unit 125. Calculation of the differential pattern will be described later.

The differential pattern storage unit 125 stores the differential pattern generated by the differential pattern generating unit 122. The differential pattern storage unit 125 outputs the differential pattern according to an instruction from the determination pattern generating unit 123.

The determination pattern generating unit 123 generates a sampling pattern as a "determination pattern" from the parameter acquired by the parameter acquisition unit 11, a provisional pattern, based on a maximum set radius, stored in the provisional pattern storage unit 124, and the differential pattern stored in the differential pattern storage unit 125. The determination pattern generating unit 123 outputs the generated sampling pattern to the sampling pattern storage unit 30 and the output control unit 13. Further, the determination pattern generating unit 123 may output, to the output control unit 13, a message indicating a normal termination or an error termination and information about progress of the processing by the sampling pattern generating unit 12 and the like.

===Noise Removal Unit 22===

Figure 3:
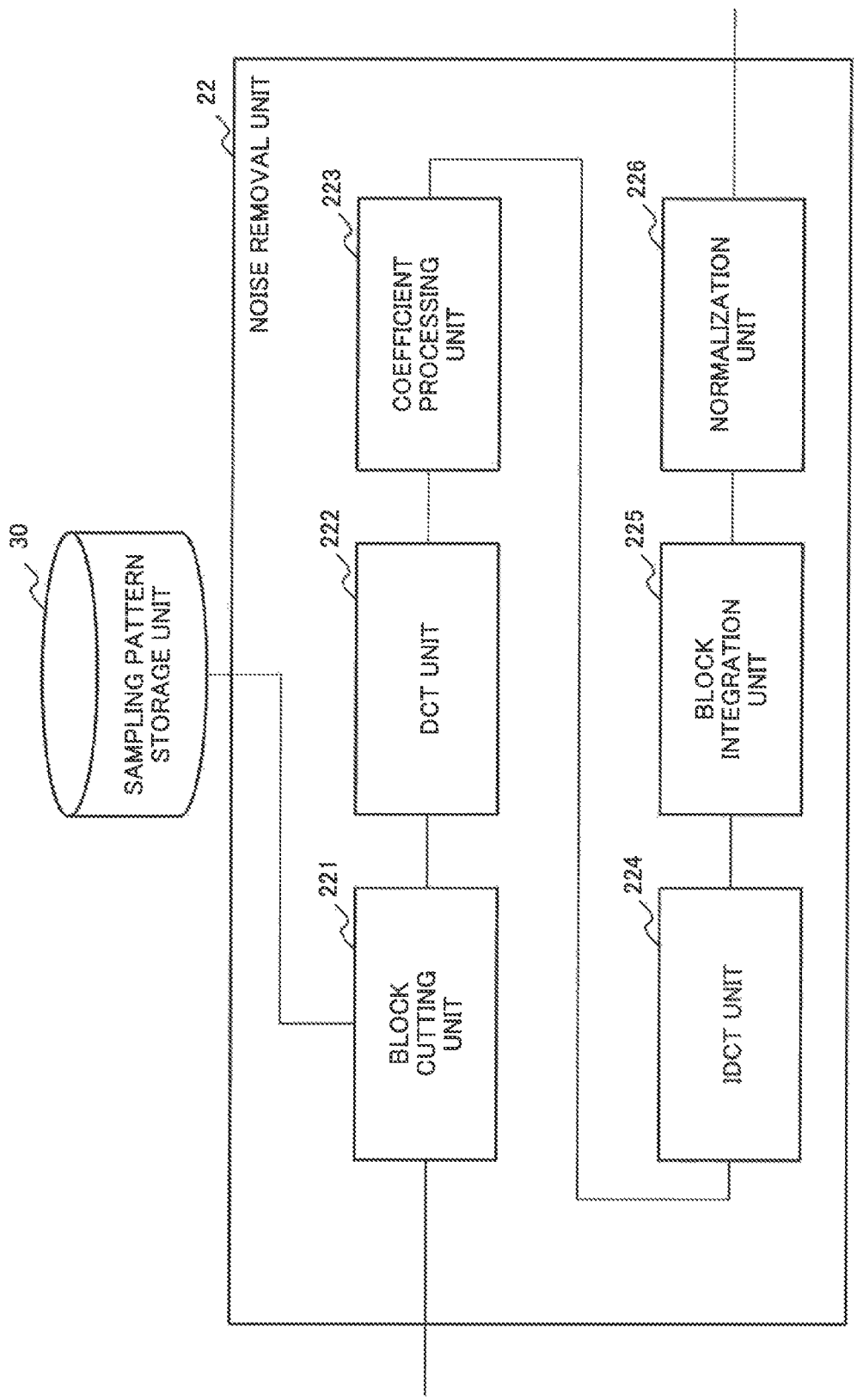
FIG. 3 is a block diagram illustrating a configuration of a noise removal unit in the first example embodiment.

As illustrated in FIG. 3, the noise removal unit 22 includes a block cutting unit 221, a DCT unit 222, a coefficient processing unit 223, an IDCT unit 224, a block integration unit 225, and a normalization unit 226.

The block cutting unit 221 cuts a plurality of blocks specified based on a sampling pattern stored in the sampling pattern storage unit 30, from an image acquired by the image acquisition unit 21.

Figure 4:
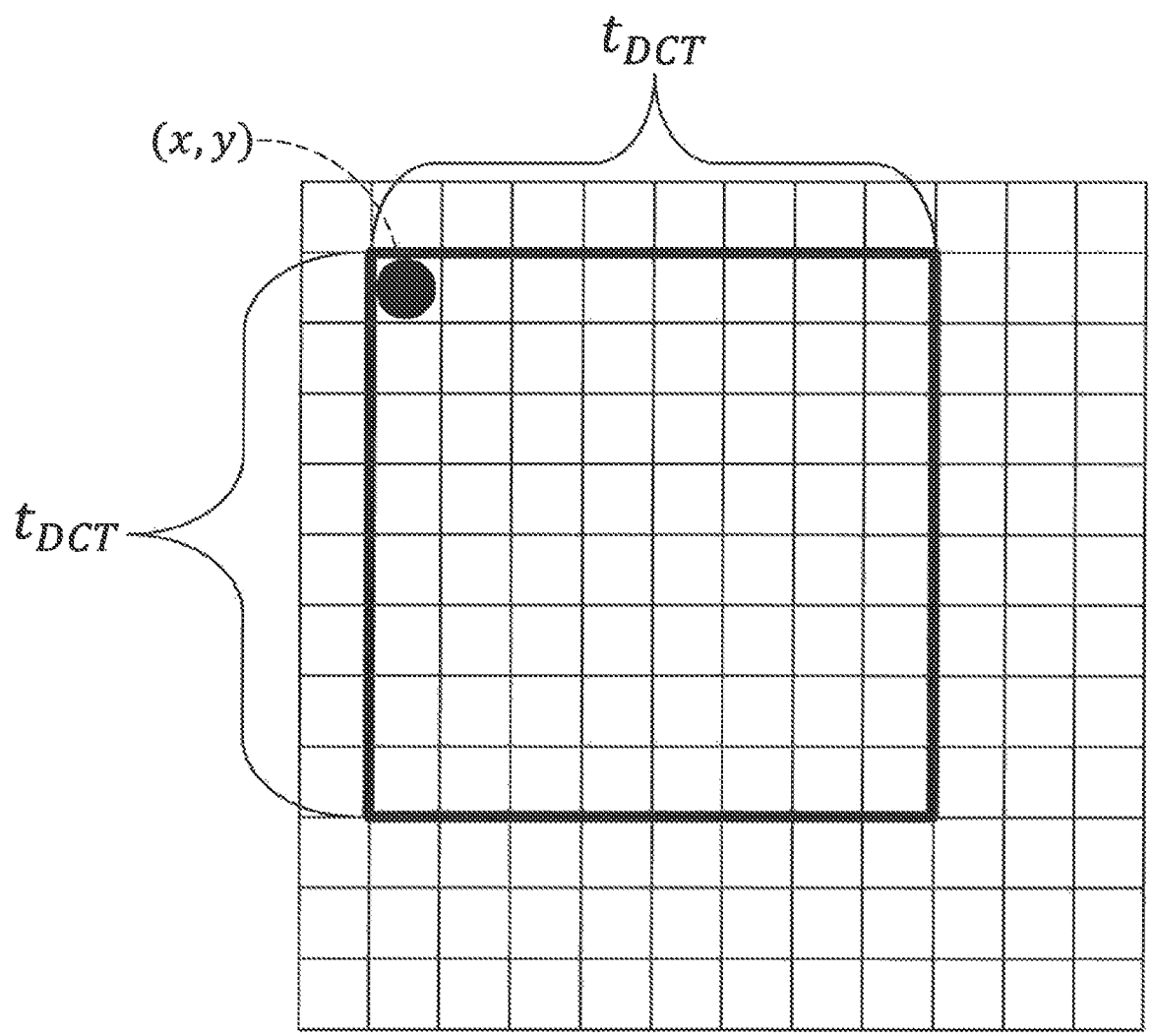
FIG. 4 is a diagram illustrating a DCT block generated with a pixel position (x, y) as a starting point.

For example, the block cutting unit 221 cuts pixels in a range illustrated in FIG. 4, from one sampling point, as a block. In other words, the block cutting unit 221 specifies, as a range of a block, a square range with respective pixels located away from a sampling point (x, y) by $t_{DCT}-1$ in a right direction (an increase direction of x) and $t_{DCT}-1$ in a lower direction (an increase direction of y) as end points.

Note that a way of cutting a block is not limited to the example illustrated in FIG. 4. A range of a block may also be a range in which a sampling point is located in a position other than an upper left corner of the block. Further, a shape of a block may not be always a square. When a range and a shape of a block are different from those in the example of FIG. 4, a range of a parameter p described later and a range of an extension of an input image may be appropriately changed.

Then, the block cutting unit 221 outputs the cut block to the DCT unit 222.

The DCT unit 222 applies a two-dimensional DCT to the block received from the block cutting unit 221, and calculates a DCT coefficient of each block as a result thereof. Then, the DCT unit 222 outputs the calculated DCT coefficient to the coefficient processing unit 223.

The coefficient processing unit 223 performs processing of degenerating the DCT coefficient received from the DCT unit 222. In other words, the coefficient processing unit 223 performs processing of reducing the number of DCT coefficients having a value that is not zero. For example, the coefficient processing unit 223 performs transform indicated in the equation (1) on a received DCT coefficient f(i, j). In other words, the coefficient processing unit 223 calculates a new transform coefficient f'(i, j) by performing correction in such a way as to change a DCT coefficient that does not satisfy a predetermined threshold value to zero. Then, the coefficient processing unit 223 outputs the transformed coefficient f'(i, j) to the IDCT unit 224.

The IDCT unit 224 performs a two-dimensional inverse DCT (IDCT) on the degenerated DCT coefficient received from the coefficient processing unit 223, and acquires an image block after noise suppression as a result thereof. The IDCT unit 224 outputs the acquired image block after the noise suppression to the block integration unit 225.

The block integration unit 225 integrates the image block after the noise suppression received from the IDCT unit 224. Specifically, the block integration unit 225 disposes each image block after the noise suppression in the same position as the position in its original input image, and cumulatively adds a pixel value in the same position. Then, the block integration unit 225 outputs the image data generated by the integration as described above to the normalization unit 226.

The normalization unit 226 performs normalization processing according to redundancy (the number of times that a pixel is added) for each pixel on the integrated image data received from the block integration unit 225. An example of calculating the redundancy will be described later. The normalization unit 226 matches a dynamic range of the image with a dynamic range of the input image. The normalization unit 226 outputs the image generated by the processing described above, as an output image, to the image output control unit 23.

Hereinafter, details of processing of each unit of the image processing device 1 will be described.

[PDS Performing Unit 121]

The PDS performing unit 121 performs PDS by using different set radii, based on a parameter acquired by the parameter acquisition unit 11. A parameter used for performing the PDS includes, for example, a maximum set radius $r_{max}$, a minimum set radius $r_{min}$, a step width $r_{step}$ of a set radius, and a height H and a width W of an input image. The parameter acquisition unit 11 may further acquire a length $t_{DCT}$ of one side of a DCT block and an image extension parameter $t_{ext}$ (described later). Note that a value of the above-described parameter is, for example, a value with one pixel as one unit.

An example of a flow of processing of performing the PDS is as follows.

The PDS performing unit 121 first initializes a parameter p of a sampling pattern. The parameter p is a parameter indicating a combination of information indicating whether or not each pixel is a sampled pixel. The parameter p is, for example, a function that takes, as a variable of a position (x, y) of a pixel, a value (hereinafter referred to as a "sample value") of "0" (indicating that the pixel is not a sampled pixel) or "1" (indicating that the pixel is a sampled pixel). The parameter p may be a two-dimensional array. Hereinafter, it is assumed that a sample value of a pixel having a position indicated by (x, y) is represented as p(x, y) as an example. Note that it is assumed that x described above is a variable which determines a column, and y described above is a variable which determines a row (line).

At a time of setting the parameter p, the PDS performing unit 121 sets all sample values to "0", as an initial value.

A size (namely, a domain of x and y) of the parameter p is W'×H' when $W'=W+t_{ext}$ and $H'=H+t_{ext}$, for example. $t_{ext}$ is, for example, a value of less than or equal to $t_{DCT}+1$. When $t_{ext}=0$, a size of the parameter p is a size W×H identical to the size of the image. It is assumed in the following description that $t_{ext}=t_{DCT}+1$.

Figure 5:
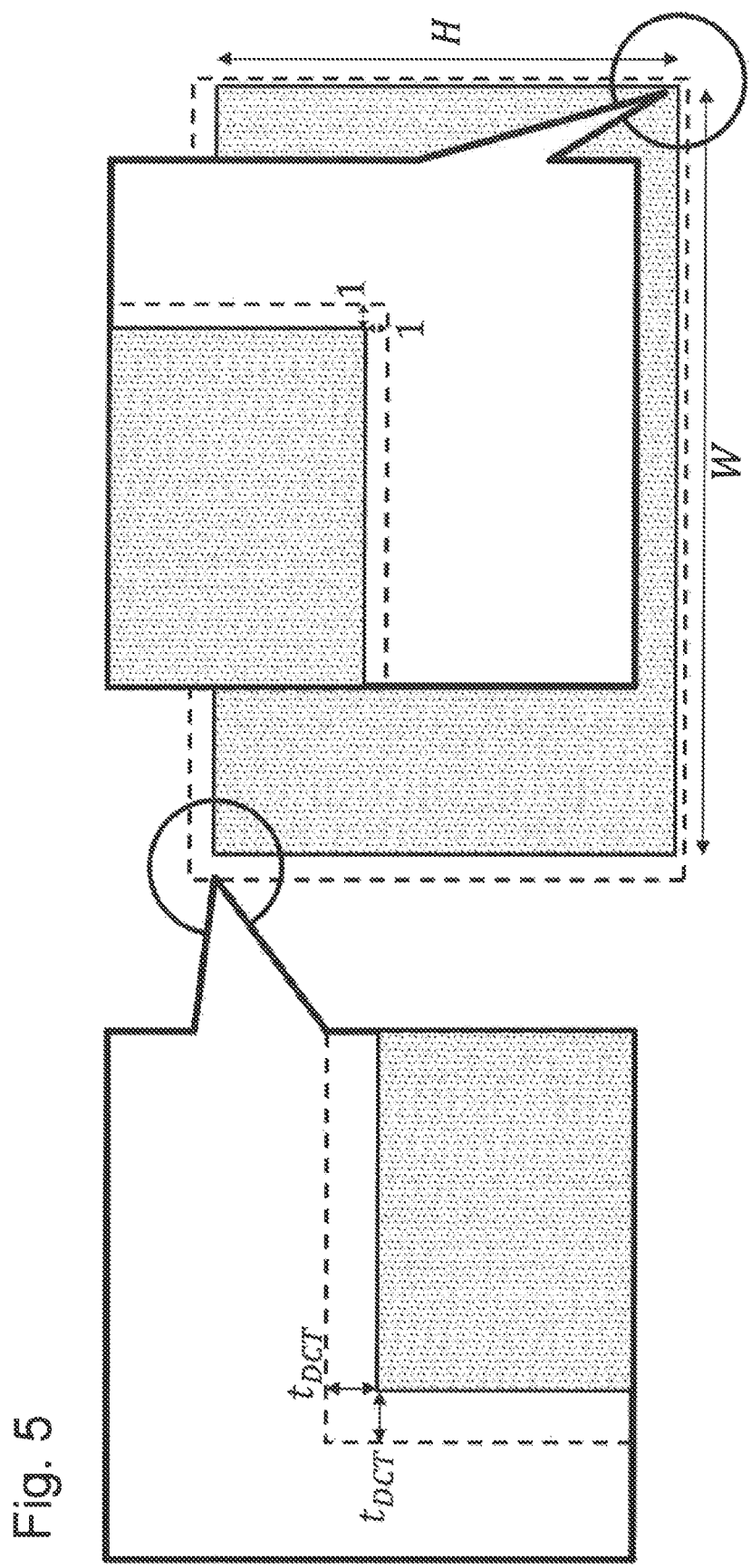
FIG. 5 is a schematic diagram exemplifying a relationship between a parameter of a sampling pattern and an image.

FIG. 5 is a diagram illustrating an example of a relationship between an image and the parameter p. In FIG. 5, a rectangular region indicated by a dot pattern is a region corresponding to a region of an input image, and a region surrounded by a dotted line outside the rectangular region is a region defining the parameter p. In other words, the parameter p is set in a region in which an upper end and a left end of the image is extended by a $t_{ext}$ pixel and a lower end and a right end is extended by one pixel. A size of the parameter p is W'×H' (wherein, $t_{ext}=t_{DCT}+1$). Such setting is based on that, as illustrated in FIG. 4, the RDCT is intended for a block having a $t_{DCT} \times t_{DCT}$ size with a pixel position (x, y) that p(x, y)=1 as a starting point. When a way of cutting a block in the RDCT is different from that described above, a way of setting the parameter p may be certainly changed according to the case. Note that, in the example of FIG. 5, it is sufficient that a range of the parameter p is a region in which the upper end and the left end of the image is extended by a $t_{ext}-1$ pixel, when only a range of a block is considered. However, the PDS tends to have a sampling point being biased toward an end, and thus a region having each end being extended extra by one pixel is used for the parameter p.

When the parameter p is initialized, the PDS performing unit 121 performs the PDS based on a set radius. The PDS performing unit 121 generates a sampling pattern by reflecting a result of the PDS in the parameter p. A specific method of the PDS is, for example, indicated as follows.

First, the PDS performing unit 121 definitizes one point being a point in the region of the input image as a sampling point. Note that, in definitizing a sampling point, for example, the PDS performing unit 121 may prepare a definite list, and add information (for example, a position) about a definitized point to the definite list. The PDS performing unit 121, for example, randomly selects and definitizes a sampling point.

Next, the PDS performing unit 121 selects one pixel in the definite list, and extracts a predetermined number of points around the selected pixel as sampling candidate points. Specifically, for example, the PDS performing unit 121 randomly extracts k points having a distance to the selected pixel of greater than or equal to r and less than or equal to 2×r. Note that r is a set radius. The set radius r is a variable in a range of $r_{min}$ to $r_{max}$, and $r=r_{max}$, for example, at the beginning of the PDS performance. k may be a fixed value being previously set, and may be a value acquired from a user by the parameter acquisition unit 11.

For example, the PDS performing unit 121 sets a position of the pixel selected from the definite list as (x, y), and sets each integer i that $1\le i \le k$ as a uniform random number value $\sigma_i$ that $0.0 \le \sigma_i \le 1.0$ and a uniform random number value $\theta_i$ that $0.0 \le \theta_i \le 360$. Then, the PDS performing unit 121 derives a position $c_i=(x_i, y_i)$ indicated by $x_i$ and $y_i$ in the following equation, by using these numerical values.

$$x_i = r_i \times \cos \theta_i$$

$$y_i = r_i \times \sin \theta_i$$

wherein, $r_i = r \times (1+\sigma_i)$ [Equation 2]

The PDS performing unit 121 extracts the position $c_i=(x_i, y_i)$ derived by the equation above as a position of a sampling candidate point. Note that the calculation equation described above is one example. Particularly, the range of $\sigma_i$ and the calculation equation of $r_1$ may be changed.

Then, the PDS performing unit 121 checks whether a point included in the definite list is present within a circle having a radius r with $c_i$ as the center for the position $c_i$ of each sampling candidate point, and, when the point is not present, the PDS performing unit 121 definitizes the candidate point as a sampling point (adds the candidate point to the definite list). When the point included in the definite list is present, the PDS performing unit 121 excludes the candidate point from the candidate (does not add the candidate point to the definite list). The PDS performing unit 121 performs the processing described above on all sampling points included in the definite list for the same set radius r, and repeats the processing until the definite list does not change.

When the definite list has no change (that is, there is no point newly added to the definite list even though the processing described above is performed on all sampling points included in the definite list), the PDS performing unit 121 definitizes a sampling pattern in the set radius. In other words, the PDS performing unit 121 definitizes each value of the parameter p in the set radius by setting a sample value of the pixel position included in the definite list as "1" and setting a sample value of a pixel other than that as "0".

The example of the method of performing the PDS is described above. A specific procedure for performing the PDS is not limited to the method described above. For example, the PDS performing unit 121 may generate a sampling pattern as follows by using an array in which a value is associated with each pixel similarly to the parameter p. In other words, the PDS performing unit 121 initializes all values in the above-described array to "0", and, when a definitized sampling point is present, the PDS performing unit 121 changes a value in the above-described array of a point having a distance to the sampling point of less than or equal to the set radius r to "1". Then, the PDS performing unit 121 may definitize a point randomly selected from pixels having a value of "0", as a sampling point, until all values in a definite pattern becomes "1".

The PDS performing unit 121 generates a sampling pattern for each set radius r. For example, the PDS performing unit 121 repeats the generation of a sampling pattern until $r < r_{min}$ while updating the set radius r to $r \leftarrow r - r_{step}$. Note that, when a value of r is not $r_{max}$, the PDS performing unit 121 uses a final definite list in previous PDS as an initial definite list in the PDS based on the set radius r thereof.

By the processing described above, the PDS performing unit 121 generates a sampling pattern for each set radius r that changes for every $r_{step}$ from $r_{max}$ to $r_{min}$. Hereinafter, each sampling pattern generated by the PDS performing unit 121 is referred to as a "provisional pattern". In arbitrary two provisional patterns, a sampling point included in a provisional pattern by the PDS based on a smaller set radius includes a sampling point included in a provisional pattern by the PDS based on a greater set radius. The PDS performing unit 121 stores each of the generated provisional patterns in the provisional pattern storage unit 124.

Note that, when a size of the parameter p is extended, the PDS performing unit 121 may definitize all provisional patterns, and then change sample values of one line of upper and lower ends and one column on the left and right of each of the provisional patterns to "0". These lines are blocks located in a position where an output pixel value is not generated in the processing of the RRDCT, and thus do not affect performance of the noise removal processing.

[Differential Pattern Generating Unit 122]

It is assumed that m number of provisional patterns $p_0$, $p_1, \ldots,$ and $p_{m-1}$ in which a sample value of "0" or "1" is provided to each pixel are stored, in the provisional pattern storage unit 124, by the PDS performing unit 121 in decreasing order of set radius. The differential pattern generating unit 122 generates a differential pattern, based on the provisional patterns. The differential pattern is a difference between adjacent sampling patterns. In other words, the differential pattern generating unit 122 calculates a differential pattern $d_i$ as in the following equation for i that $0 \le i \le m-2$, for example.

$$d_i = p_{i+1} - p_i$$ [Equation 3]

Note that, when $p_i$ is an array, $d_i$ is an array having the same size as that of $p_i$.

The differential pattern generating unit 122 stores m−1 number of differential patterns calculated in such a manner in the differential pattern storage unit 125.

Note that it is clear from progress of the provisional pattern generation that $p_{m-1} = p_0 + \Sigma_{i=0 \rightarrow m-2} d_1$. The subscript "i=0→m−2" of the symbol "Σ" represents that "i takes a value in 1 interval from 0 to m−2".

[Determination Pattern Generating Unit 123]

The determination pattern generating unit 123 generates a sampling pattern from a provisional pattern $p_0$ based on a maximum set radius, m−1 number of differential patterns $d_0$, $d_1, \ldots, d_{m-2}$, a block size $t_{DCT}$ of the DCT, and a reference value $n_{max}$ of a sample number per one line. Hereinafter, the sampling pattern generated by the determination pattern generating unit 123 is referred to as a "determination pattern". Note that a value of $n_{max}$ may be previously stored in the determination pattern generating unit 123, or acquired from a user via the parameter acquisition unit 11.

An example of a method of generating a determination pattern by the determination pattern generating unit 123 is as follows.

The determination pattern generating unit 123 first obtains a sample number in each line, based on $p_0$. In other words, the determination pattern generating unit 123 calculates a number $n_{p\_0}(j)$ of pixels having a sample value of "1" in a line j (namely, j-th row).

$$n_{p0}(j) = \Sigma_x p_0(x, j)$$ [Equation 4]

Note that a subscript may be represented by using an underscore "_" in the present disclosure. For example, "$p_0$" may be represented by "p_0". Further, for example, "d_i" is the same as "$d_i$".

Further, the determination pattern generating unit 123 also calculates a sample number $n_{d\_i}(j)$ in each line for the differential pattern $d_i$ as follows.

$$n_{d_i}(j)=\Sigma_x d_i(x,j) \quad \text{[Equation 5]}$$

The determination pattern generating unit 123 makes an error judgment for checking whether the generation of a determination pattern is possible in generating a determination pattern. The error judgment includes two following judgments.

Judgment (i): whether $\max_i n_{p\_0}(j) \leq n_{max}$. In other words, whether $n_{p\_0}(j)$ is less than or equal to $n_{max}$ for all j.

Judgment (ii): whether $\min_j \{n_{p\_0}(j)+\Sigma_{i=0 \to m-2} n_{d\_i}(j)\} \geq n_{max}$.

In other words, whether $n_{p\_0}(j)+\Sigma_{i=0 \to m-2} n_{d\_i}(j)$ is greater than or equal to $n_{max}$ for all j.

In a case where $\max_j n_{p\_0}(j) > n_{max}$ in regard to the judgment (i), the determination pattern generating unit 123 outputs a first error code indicating that the determination pattern cannot be generated, to the output control unit 13. In this case, it is conceivable that $n_{max}$ is too small or the maximum set radius $r_{max}$ is too small. In this case, the output control unit 13 may perform control in such a way as to display a message for a user to set greater $n_{max}$ or greater $r_{max}$.

In a case where $\min_j \{n_{p\_0}(j)+\Sigma_{i=0, m-2} n_{d\_i}(j)\} < n_{max}$ in regard to the judgment (ii), the determination pattern generating unit 123 outputs a second error code indicating that the determination pattern cannot be generated, to the output control unit 13. In this case, it is conceivable that $n_{max}$ is too great, the minimum set radius $r_{min}$ is too great, or the step width $r_{step}$ of the set radius is too great. In this case, the output control unit 13 may perform control in such a way as to display a message for a user to set any of smaller $n_{max}$, $r_{min}$, and $r_{step}$.

Note that $n_{p\_0}(j)+\Sigma_{i=0, m-2} n_{d\_i}(j)$ has the same value as that of a sample number in the line j of the provisional pattern $p_{m-i}$. Therefore, the determination pattern generating unit 123 calculates a sample number $n_{p(m-1)}(j)$ in the line j of the provisional pattern $p_{m-1}$, and may make a judgment by replacing the judgment (ii) with a judgment of "whether $\min_j n_{p\_(m-1)}(j) \geq n_{max}$". In other words, the determination pattern generating unit 123 may check whether $n_{p\_(m-1)}(j)$ is greater than or equal to $n_{max}$ for all j, as the judgment (ii).

When it is not judged as an error in the error judgment, the determination pattern generating unit 123 generates a determination pattern $p_f$. It is specifically described as follows.

First, the determination pattern generating unit 123 calculates redundancy $n_{red}(x, y)$ of each pixel when a DCT block pattern set based on the provisional pattern $p_0$ is used.

A method of calculating the redundancy $n_{red}(x, y)$ is as follows. First, the determination pattern generating unit 123 initializes $n_{red}(x, y)$. $n_{red}(x, y)$ is a function representing redundancy of a pixel having a position of (x, y). An initial value of $n_{red}(x, y)$ is "0" in all groups of x and y. Next, the determination pattern generating unit 123 specifies a pixel that $p_0(x, y)=1$ by referring to $p_0$, and adds "1" to a value of $n_{red}(x', Y)$ for a group of x' and y' in a range of $x \leq x' \leq x+t_{DCT}-1$ and $y \leq y' \leq y+t_{DCT}-1$. The determination pattern generating unit 123 acquires the redundancy $n_{red}$ by repeating the addition for all (x, y) that $p_0(x, y)=1$. Note that, when a size of a sampling pattern is extended, the determination pattern generating unit 123 may calculate redundancy in each position in a region (region indicated by the dot pattern in FIG. 5) corresponding to the input image.

Next, the determination pattern generating unit 123 specifies a minimum i that satisfies $n_{p\_0}(j)+\Sigma_i n_{d\_i}(j) \geq n_{max}$ in the line j. Hereinafter, it is assumed that the specified i is $i_{target}$.

When $i_{target}$ satisfies $n_{p\_0}(j)+\Sigma_{i=0 \to i\_target} n_{d\_i}(j)=n_{max}$, that is, when $n_{p\_(i\_target+1)}(j)$ is equal to $n_{max}$, the determination pattern generating unit 123 definitizes a sampling pattern $p_f(x, j)$ in the line j as $p_f(x, j)=p_0(x, j)+\Sigma_{i=0 \to i\_target} d_i$ for all x (or extract $p_{i\_target}$ in the j-th row). Further, the determination pattern generating unit 123 cumulatively adds as $n_{red}(x', y') \leftarrow n_{red}(x', y')+1$ in a range of each $x \leq x' \leq x+t_{DCT}-1$ and $j \leq y' \leq j+t_{DCT}-1$ for (x, j) that satisfies $p_f(x, j)=1$.

When $i_{target}$ satisfies $n_{p\_0}(j)+\Sigma_{i=0 \to i\_target} n_{d\_i}(j) > n_{max}$, that is, when $n_{p\_(i\_target+1)}(j)$ exceeds $n_{max}$, the determination pattern generating unit 123 adds a sampling point to $p_0+\Sigma_{i=0 \to i\_target-1} d_i (=p_{i\_target})$ in such a way that a sampling point in the j-th row becomes $n_{max}$.

Specifically, the determination pattern generating unit 123 first definitizes $n_{p\_i\_target}(j)$ sampling points in the line j as $p_f(x, j)=p_0(x, j)+\Sigma_{i\ 0 \to i\_target-1} d_i(x, y)$ for all x (or extracts $p_{i\_target}$ in the j-th row). A pattern of the sampling points definitized in this way is a base of the determination pattern. Further, the determination pattern generating unit 123 cumulatively adds as $n_{red}(x', y') \leftarrow n_{red}(x', y')+1$ in a range of each $x \leq x' \leq x+t_{DCT}-1$ and $j \leq y' \leq j+t_{DCT}-1$ for (x, j) that satisfies $p_f(x, j)=1$.

Next, the determination pattern generating unit 123 adds a sampling point to the base of the determination pattern. The determination pattern generating unit 123 extracts a sampling point from $d_{i\_target}$, for example. The determination pattern generating unit 123 calculates a "spatial" cumulatively added value $n_{red, sum}(x, j)$ of the redundancy for each pixel position (x, j) that $d_{i\_target}(x, j)=1$ as follows.

$$n_{red,sum}(x,j)=\Sigma_{y'=j}^{j+tDCT-1}\Sigma_{x'=x}^{x+tDCT-1} n_{red}(x',y') \quad \text{[Equation 6]}$$

$n_{red,sum}(x, j)$ is a total sum of the redundancy of (x', y') that satisfies $x \leq x' \leq x+t_{DCT}-1$ and $j \leq y' \leq j+t_{DCT}-1$. In the present example embodiment, $n_{red,sum}(x, j)$ is also referred to as a "redundant density".

Then, the determination pattern generating unit 123 adds a sampling point, based on the redundant density. For example, the determination pattern generating unit 123 specifies a pixel position (x, j) having $n_{red,sum}(x, j)$ of zero among sampling points in the j-th row of $d_{i\_target}$. Then, the determination pattern generating unit 123 adds the specified pixel position (x, j) to a sampling pattern (that is, sets $p_f(x, j)=1$). When there is no pixel position (x, j) in which $n_{red,sum}(x, j)$ is zero, the determination pattern generating unit 123 may randomly extract a sampling point from the j-th row of $d_{i\_target}$, and add the extracted sampling point to a sampling pattern. Alternatively, the determination pattern generating unit 123 may add a pixel position (x, j) having minimum $n_{red,sum}(x, j)$ to a sampling pattern. Variations in sampling point are improved by preferentially determining a pixel position having small $n_{red,sum}(x, j)$ as a sampling point. The determination pattern generating unit 123 updates $n_{red}$ after adding the sampling point. The determination pattern generating unit 123 definitizes the sampling pattern $p_f(x, j)$ in the line j by repeating this series of processing until the sample number in the line j becomes $n_{max}$.

When the sampling pattern in all the lines is definite, a sampling pattern $p_f(x, y)$ generated from this is a determination pattern. The determination pattern generating unit 123 performs an inspection of presence or absence of an error on the determination pattern. Specifically, the determination pattern generating unit 123 checks whether a pixel that $n_{red}(x, y)=0$ is present. The pixel that $n_{red}(x, y)=0$ is a pixel that is not included in any of blocks being cut based on the determination pattern. When the pixel that $n_{red}(x, y)=0$ is present, the output control unit 13 performs control in such a way as to output an error indicating that an appropriate determination pattern cannot be generated. In this case, it is conceivable that $n_{max}$ is too small, the minimum set radius $r_{min}$ is too great, or the step width $r_{step}$ of the set radius is too great. Therefore, for example, the output control unit 13 may perform control in such a way as to display a message instructing a user to set greater $n_{max}$ or smaller $r_{min}$ and $r_{step}$.

When the pixel that $n_{red}(x, y)=0$ is not present, the determination pattern generating unit 123 outputs the determination pattern $p_f(x, y)$ to the sampling pattern storage unit 30 and the output control unit 13.

[Image Acquisition Unit 21]

The image acquisition unit 21 acquires an input image, and outputs the acquired input image to the noise removal unit 22. Note that the image acquisition unit 21 may extend the acquired input image. For example, the image acquisition unit 21 extends an input image in such a way that the input image includes a range to be sampled in the PDS by the PDS performing unit 121.

Figure 6:
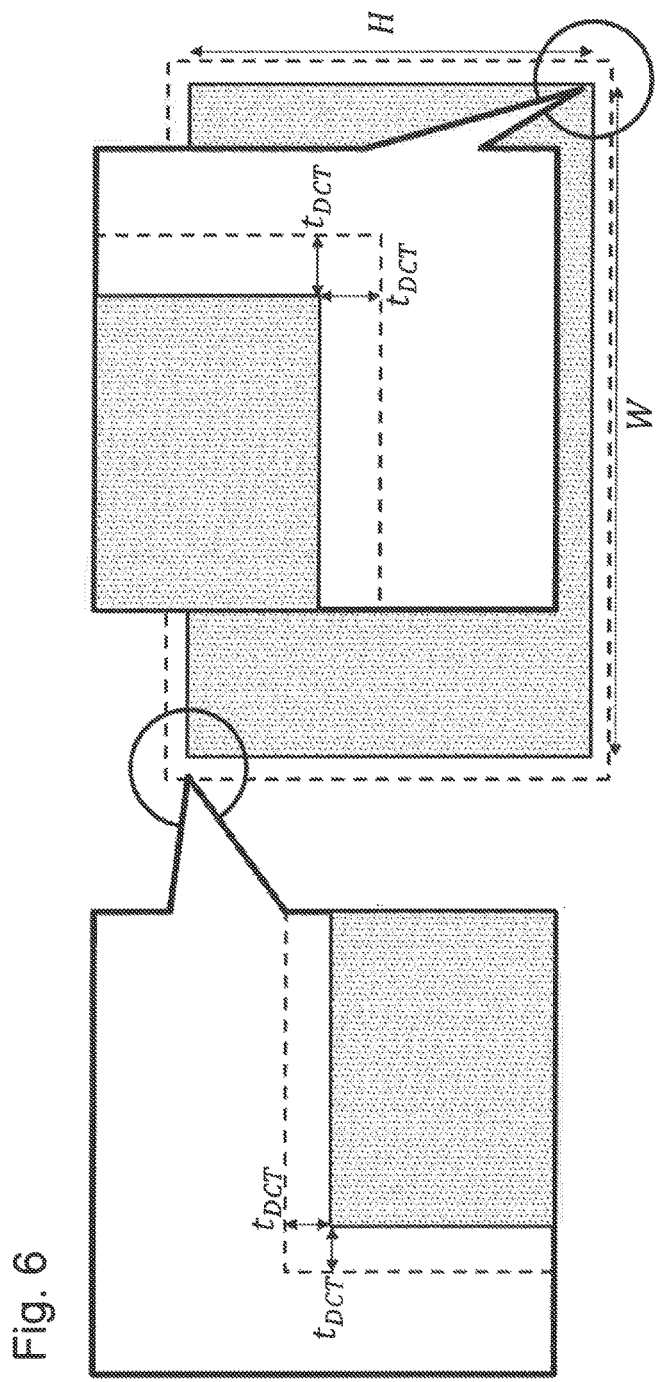
FIG. 6 is a schematic diagram exemplifying an extension of an image.

Hereinafter, an example of an extension of an image will be described by using FIG. 6. FIG. 6 is a schematic diagram of an image extended by the image acquisition unit 21 when the region indicated by the dotted line in FIG. 5 is a target range of the PDS. In FIG. 6, a rectangular region indicated by a dot pattern is a region corresponding to an input image, and a dotted line outside the region is an outline of an extended image. In the example of FIG. 6, each upper, lower, left, and right of the image is extended by a $t_{DCT}$ pixel. The reason why the upper end and the left end of the image are extended by the $t_{DCT}$ pixel is that an extended range is a target range of the PDS. For the target range of the PDS, the right end and the lower end of the image are extended by one pixel, but the image acquisition unit 21 extends the right end and the lower end to the outside further by a $t_{DCT}-1$ pixel in such a way that a DCT block having a $t_{DCT} \times t_{DCT}$ size can be cut based on a sampling point.

Note that a pixel value of an extended region may be, for example, a copy of a pixel value of upper, lower, left, and right ends of an input image, or a pixel value copied in such a way that pixel values are symmetric with respect to an outline of an input image.

[Block Cutting Unit 221]

The block cutting unit 221 cuts a DCT block from an input image, based on a sampling pattern (determination pattern $p_f(x, y)$) received from the sampling pattern storage unit 30. For example, the block cutting unit 221 generates each DCT block having a $t_{DCT} \times t_{DCT}$ size formed of the pixels in the range illustrated in FIG. 4 for each (x, y) that $p_f(x, y)=1$. The block cutting unit 221 outputs the generated DCT block to the DCT unit 222.

[Image Output Control Unit 23]

The image output control unit 23 performs control in such a way as to output an image after noise removal received from the normalization unit 226. Note that, when the image is extended by the image acquisition unit 21, the image output control unit 23 may remove an extended region, and perform control in such a way as to output an image having the extended region being removed.

<Operation>

Figure 7:
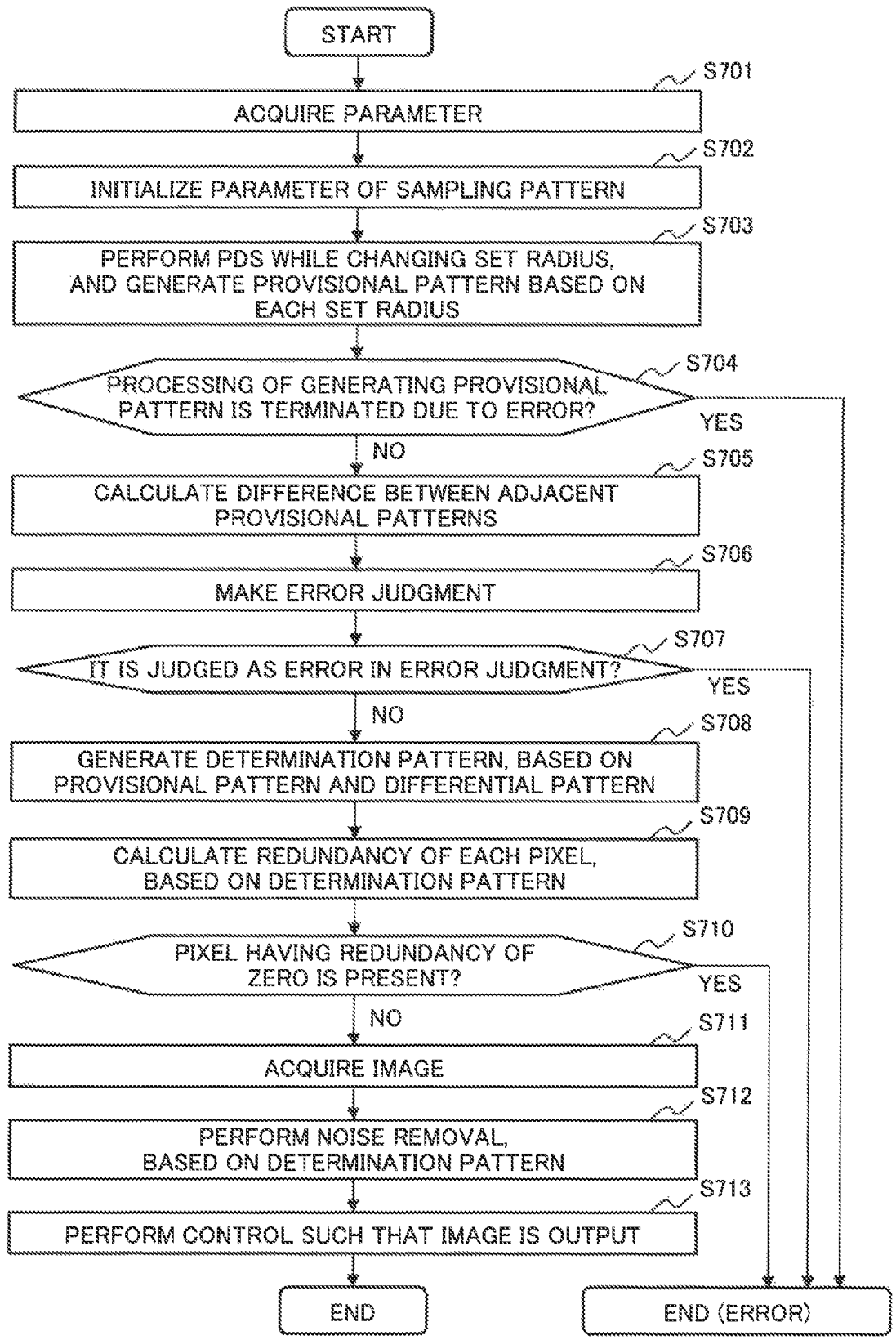
FIG. 7 is a flowchart illustrating an example of an operation of image processing by the image processing device in the first example embodiment.

Hereinafter, an operation of the image processing device 1 will be described with reference to FIG. 7. FIG. 7 is a flowchart illustrating an operation of image processing by the image processing device 1.

First, the parameter acquisition unit 11 acquires a predetermined parameter (Step S701). Then, the sampling pattern generating unit 12 receives the acquired parameter.

Next, in the sampling pattern generating unit 12, the PDS performing unit 121 first initializes a parameter of a sampling pattern (Step S702).

Next, the PDS performing unit 121 of the sampling pattern generating unit 12 performs the PDS while changing a set radius, and generates a sampling pattern (provisional pattern) based on each set radius (Step S703). When the processing in Step S703 is terminated due to an error (YES in Step S704), the image processing device 1 terminates the processing as an error.

When the processing in Step S703 is successful (NO in Step S704), the differential pattern generating unit 122 calculates a difference (differential pattern) between adjacent provisional patterns (Step S705).

Next, the determination pattern generating unit 123 makes an error judgment (the judgment (i) and the judgment (ii) described above) (Step S706). When it is judged as an error (YES in Step S707), the image processing device 1 terminates the processing as an error. When it is not judged as an error (NO in Step S707), the determination pattern generating unit 123 generates a sampling pattern (determination pattern) in which a sample number in each row is equal to a reference value, based on the provisional pattern and the differential pattern (Step S708).

Next, the determination pattern generating unit 123 calculates redundancy of each pixel when a block is cut, based on the determination pattern (Step S709). Then, the determination pattern generating unit 123 checks whether a pixel having redundancy of "0" is present. When a pixel having redundancy of "0" is present (YES in Step S710), the determination pattern generating unit 123 performs error processing and terminates the processing. When a pixel having redundancy of "0" is not present (NO in Step S710), the determination pattern generating unit 123 stores the determination pattern in the sampling pattern storage unit 30. Then, the processing proceeds to Step S711.

In Step S711, the image acquisition unit 21 acquires an image to be a target on which noise removal processing is performed.

Next, the noise removal unit 22 performs noise removal by the RRDCT on the input image acquired in Step S711, based on the determination pattern (Step S712).

Next, the image output control unit 23 performs control in such a way as to output the image after the noise removal generated in Step S712 (Step S713).

By the flow of the processing as described above, the image processing device 1 outputs the image on which the noise removal is performed based on the sampling pattern (determination pattern) in which the sample number in each row is equal to the reference value.

Note that, when the image processing device 1 continuously processes an image, the image processing device 1 may reuse the determination pattern generated for the first image in the processing on second and subsequent images, instead of newly generating a determination pattern. In other words, the processing from Steps S701 to S710 may be omitted in the processing on the second and subsequent images.

[Processing of Performing PDS]

Figure 8:
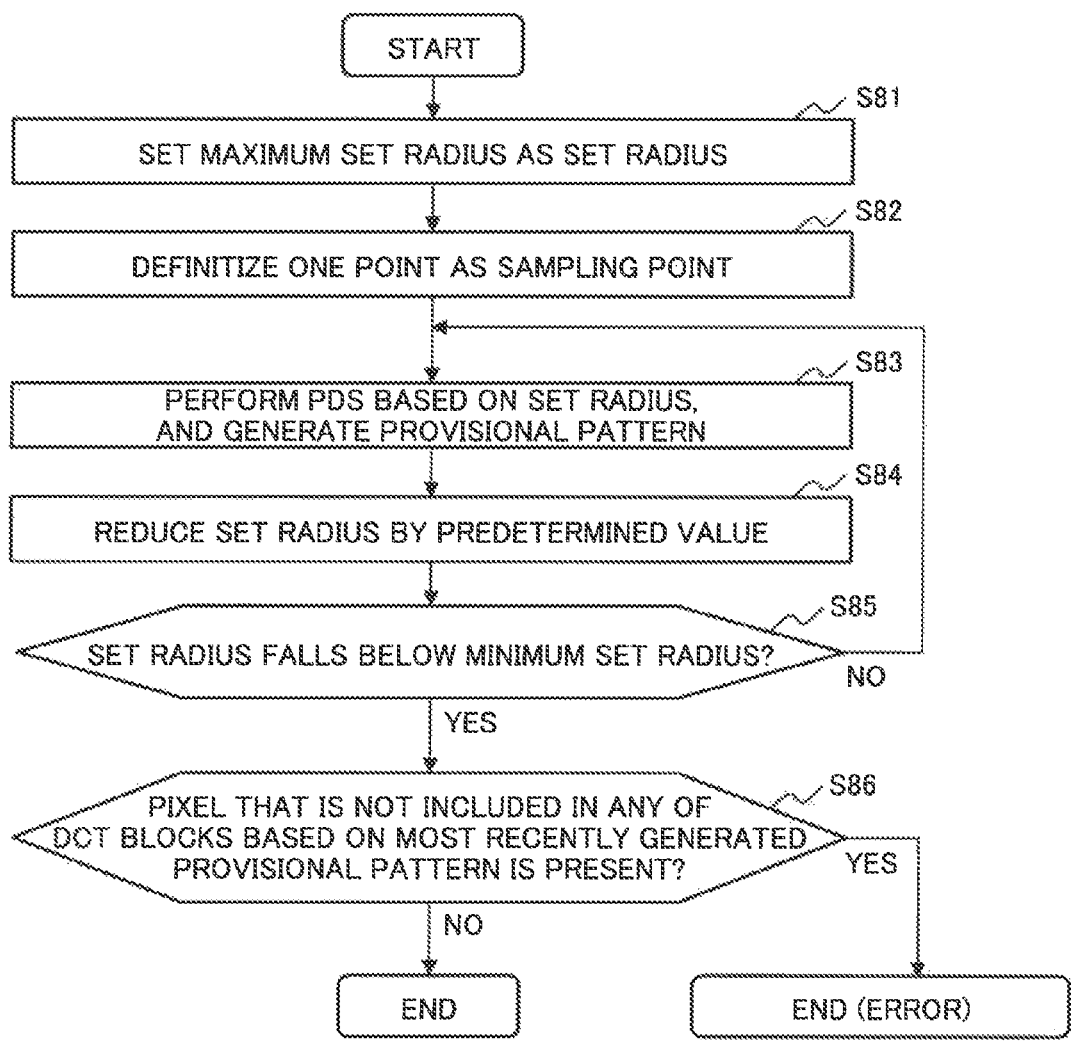
FIG. 8 is a flowchart exemplifying a flow of processing of a PDS performing unit.

An example of a flow of processing of performing the PDS by the PDS performing unit 121 in Step S703 will be described with reference to a flowchart in FIG. 8.

The PDS performing unit 121 first sets a maximum set radius as a set radius (Step S81). Then, the PDS performing unit 121 definitizes one point in the parameter p as a sampling point (Step S82).

Next, the PDS performing unit 121 performs the PDS based on the set radius, and generates a provisional pattern (Step S83).

Next, the PDS performing unit 121 reduces the set radius by a predetermined value ($r_{step}$) (Step S84).

When a new set radius falls below a minimum set radius ($r_{min}$) (YES in Step S85), the processing proceeds to Step S86. When the new set radius does not fall below the minimum set radius (NO in Step S85), the PDS performing unit 121 generates a provisional pattern, based on the new set radius (Step S83). The same holds true for the following.

In Step S86, the PDS performing unit 121 judges whether a pixel that is not included in any of DCT blocks is present when the DCT blocks are cut based on the most recently generated provisional pattern (namely, a provisional pattern having the minimum set radius among provisional patterns) (Step S86). In other words, the PDS performing unit 121 judges whether a pixel having redundancy of "0" is present in the most recently generated provisional pattern. When the judgment result is YES, the PDS performing unit 121 judges that an error occurs, and terminates the processing. When the judgment result is NO, the PDS performing unit 121 judges that the generation of the provisional pattern is successful, and terminates the processing.

[Error Judgment]

Figure 9:
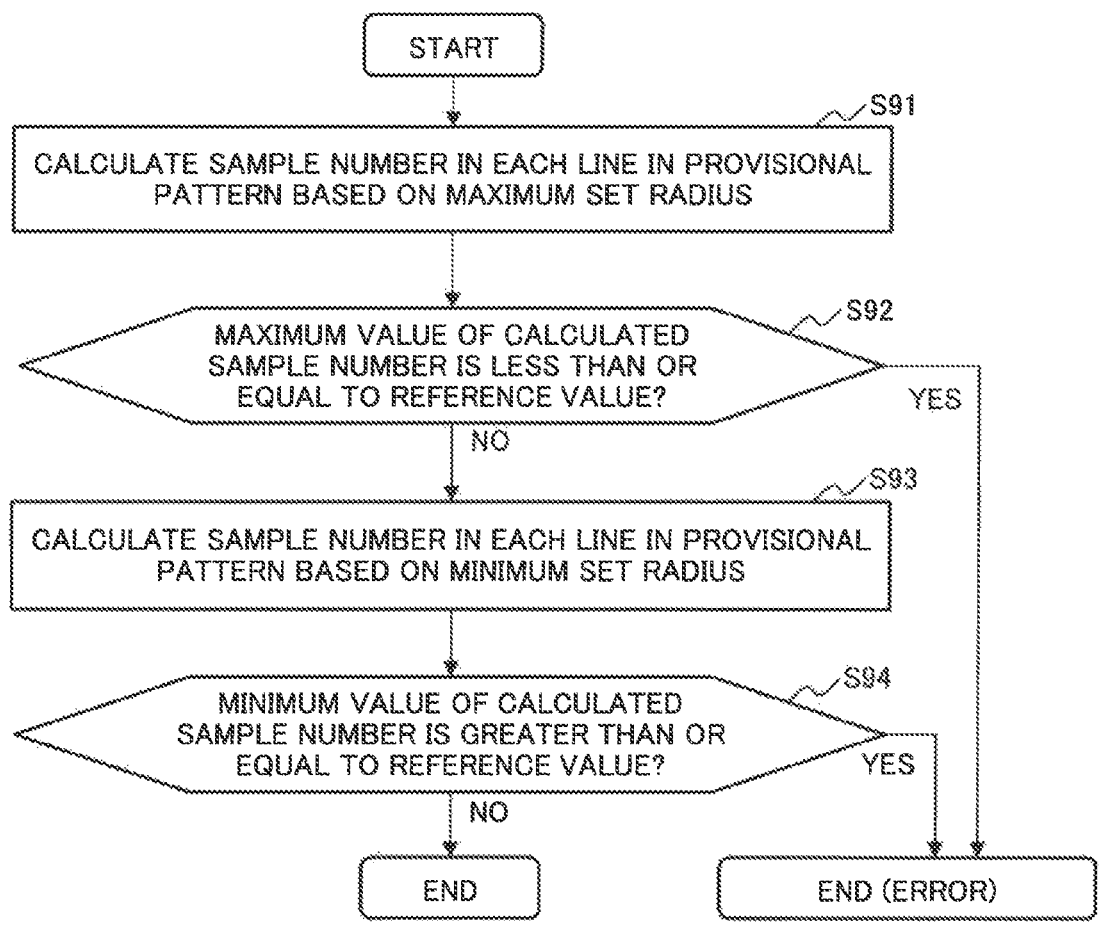
FIG. 9 is a flowchart exemplifying a flow of processing of an error judgment.

FIG. 9 is a flowchart illustrating a flow of the processing of the error judgment in Step S706. In the error judgment, the determination pattern generating unit 123 first calculates a sample number in each line in the provisional pattern based on the maximum set radius (Step S91). Then, it is judged whether a maximum value of the calculated sample number is less than or equal to a reference value ($n_{max}$) (Step S92). When the maximum value is less than or equal to the reference value (YES in Step S92), it is judged as an error, and the processing is terminated.

Further, the determination pattern generating unit 123 calculates a sample number in each line in the provisional pattern based on the minimum set radius (Step S93). Then, it is judged whether a minimum value of the calculated sample number is greater than or equal to the reference value (Step S94). When the minimum value is greater than or equal to the reference value (YES in Step S94), it is judged as an error, and the processing is terminated.

When it is NO in both of the judgment in Step S92 and the judgment in Step S94, it is assumed that there is no error, and the processing of the error judgment is terminated.

Note that the error judgment processing may precede the processing in Step S705. Further, the PDS performing unit 121 may make the error judgment instead of the determination pattern generating unit 123.

[Processing of Generating Determination Pattern]

Figure 10:
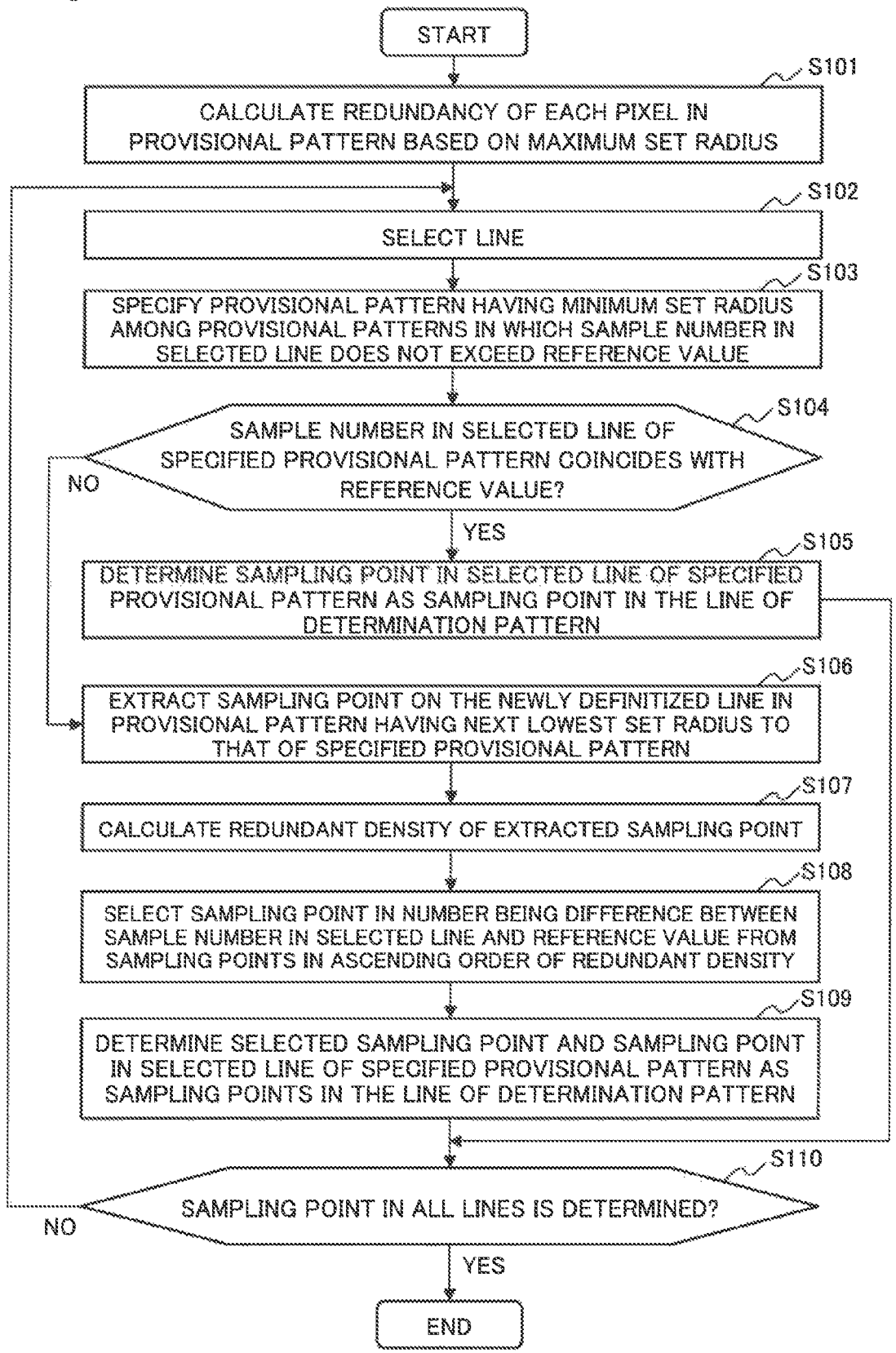
FIG. 10 is a flowchart exemplifying a flow of processing of generating a determination pattern.

An example of a flow of the processing of generating a determination pattern by the determination pattern generating unit 123 in Step S707 will be described with reference to a flowchart in FIG. 10.

The determination pattern generating unit 123 first calculates redundancy ($n_{red}(x, y)$) of each pixel in the provisional pattern based on the maximum set radius (Step S101).

Next, the determination pattern generating unit 123 selects a line in which a point is not determined as a sampling point of a determination pattern (Step S102).

Next, the determination pattern generating unit 123 specifies a provisional pattern ($p_{i\_target}$) having a minimum set radius among provisional patterns in which a sample number in the selected line does not exceed the reference value (Step S103).

When the sample number in the selected line of the specified provisional pattern coincides with the reference value (YES in Step S104), the determination pattern generating unit 123 determines a sampling point in the selected line of the specified provisional pattern as a sampling point in the line of the determination pattern (Step S105). Then, the processing proceeds to a judgment in Step S110 described later.

When the sample number in the selected line of the specified provisional pattern does not coincide with the reference value (NO in Step S104), the determination pattern generating unit 123 determines a sampling point in number that coincides with the reference value by processing from Step S106 to Step S109.

First, in Step S106, the determination pattern generating unit 123 extracts a sampling point on the newly definitized line in a provisional pattern having a next lowest set radius to that of the specified provisional pattern (Step S106). Then, the determination pattern generating unit 123 calculates a redundant density of each extracted sampling point (Step S107).

Then, the determination pattern generating unit 123 selects a sampling point in number being a difference between the sample number in the selected line and the reference value, from sampling points in ascending order of redundant density (Step S108).

Then, the determination pattern generating unit 123 determines the selected sampling point and the sampling point in the selected line of the specified provisional pattern as sampling points in the line of the determination pattern (Step S109). Then, the processing proceeds to the judgment in Step S110.

In Step S110, the determination pattern generating unit 123 judges whether a sampling point in all lines is determined. When a line in which a sampling point has not yet been determined is present (NO in Step S110), the determination pattern generating unit 123 performs the processing from Step S102 again. When a sampling point in all lines is determined (YES in Step S110), the determination pattern is completed. The determined sampling point in each line is a sampling point in the determination pattern. In this case, the determination pattern generating unit 123 terminates the processing of generating a determination pattern.

<Effect>

An effect of the first example embodiment will be described. According to the image processing device 1, a sampling pattern having a fixed sample number in each line is used in the noise removal of an image by the noise removal unit 22, and thus throughput of each line is identical. In this way, efficiency of the processing of the noise removal is improved. Further, a processing delay set in hardware implementation can be minimized. In other words, implementation of hardware is facilitated.

The reason why a sampling pattern having a fixed sample number in each line can be generated is that the determination pattern generating unit 123 adds a sampling point for each line until a sample number becomes a reference value with reference to any of provisional patterns. A sampling point to be added is selected from a sampling point already definitized in such a way as to satisfy a condition of the PDS. Thus, it is ensured that variations in redundancy of each pixel, namely, variations in sampling point do not become worse.

Particularly, a sampling point having a low redundant density is preferentially selected as a sampling point to be added, and thus redundancy of each pixel becomes more uniform. In this way, a decrease in the noise removal performance can be prevented.

Second Example Embodiment

A second example embodiment of the present invention is described.

The second example embodiment is an aspect in which an image of higher quality is generated by adapting a sampling pattern to an input image on which the noise removal processing is performed while setting throughput of each line to be identical, similarly to the first example embodiment.

<Configuration>

Figure 11:
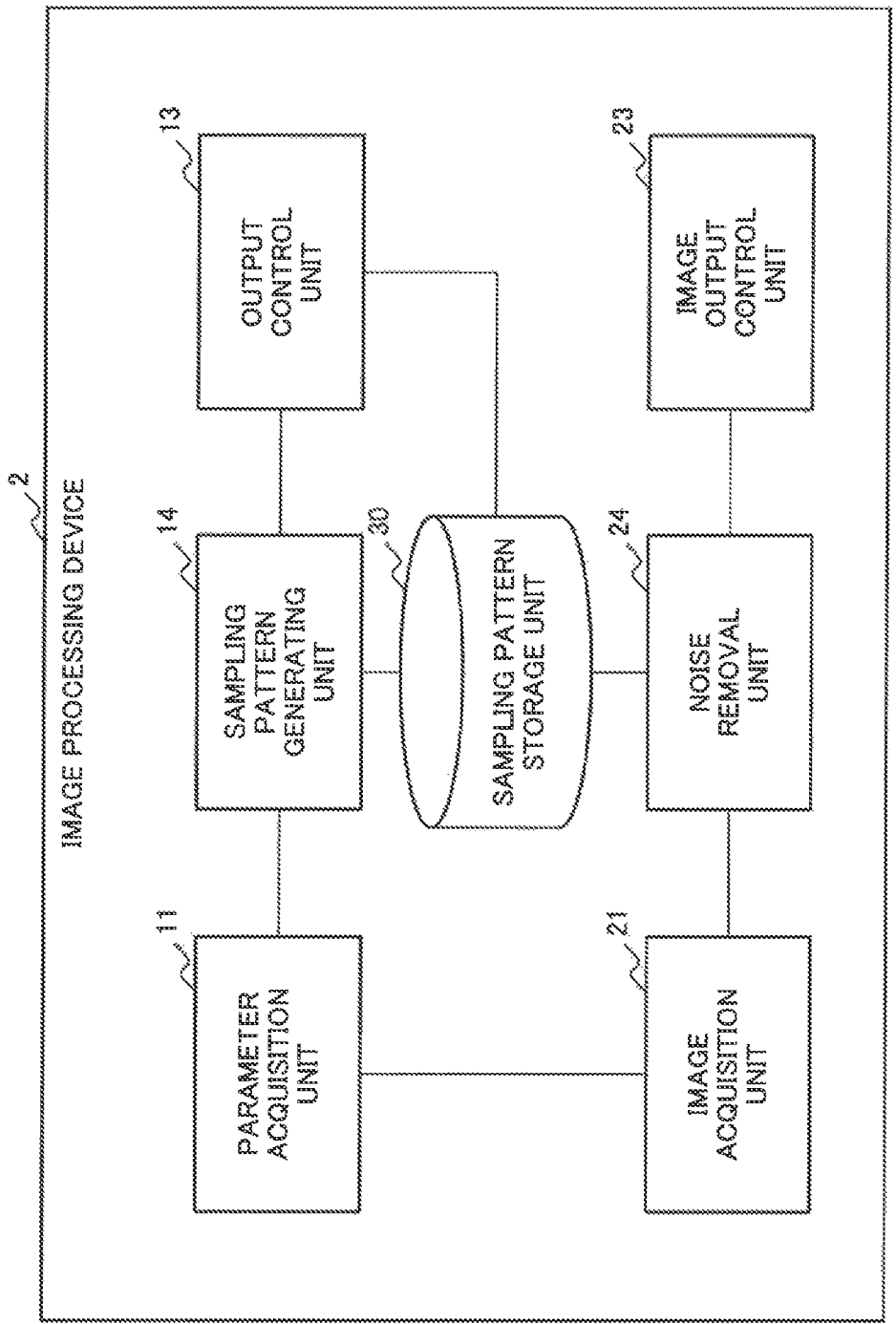
FIG. 11 is a block diagram illustrating a configuration of an image processing device in a second example embodiment of the present invention.

FIG. 11 is a block diagram illustrating a configuration of an image processing device 2 according to the second example embodiment. The image processing device 2 includes a parameter acquisition unit 11, an output control unit 13, an image acquisition unit 21, an image output control unit 23, and a sampling pattern storage unit 30, similarly to the image processing device 1 in the first example embodiment. However, the image processing device 2 includes a sampling pattern generating unit 14 and a noise removal unit 24 instead of the sampling pattern generating unit 12 and the noise removal unit 22, in contrast to the image processing device 1 in the first example embodiment.

Hereinafter, the sampling pattern generating unit 14 and the noise removal unit 24 different from those of the image processing device 1 in the first example embodiment are described in detail.

Figure 12:
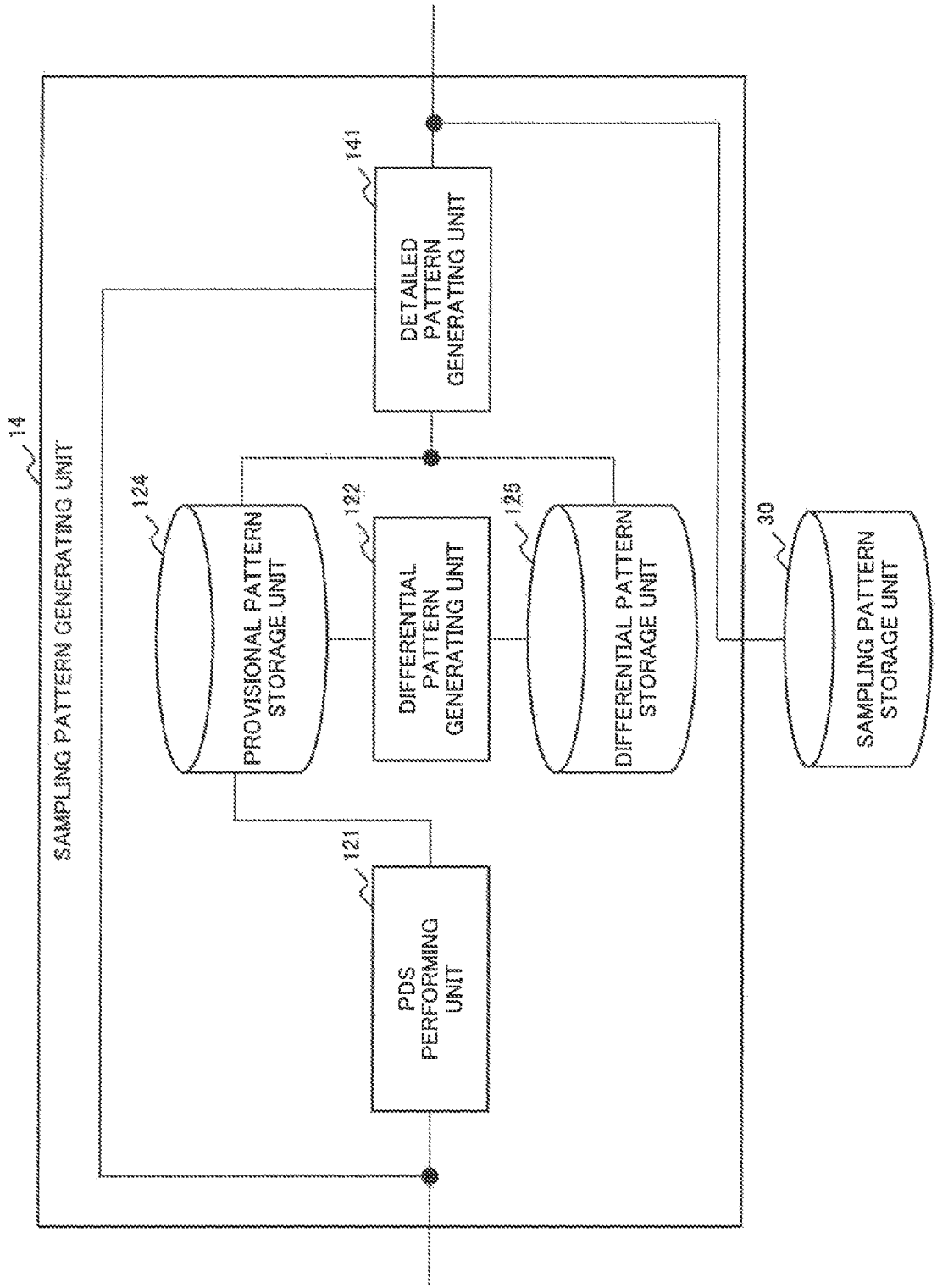
FIG. 12 is a block diagram illustrating a configuration of a sampling pattern generating unit in the second example embodiment.

FIG. 12 is a block diagram illustrating a configuration of the sampling pattern generating unit 14. The sampling pattern generating unit 14 includes a PDS performing unit 121, a differential pattern generating unit 122, a provisional pattern storage unit 124, and a differential pattern storage unit 125, similarly to the sampling pattern generating unit 12. However, the sampling pattern generating unit 14 includes a detailed pattern generating unit 141 instead of the determination pattern generating unit 123 in the first example embodiment.

The detailed pattern generating unit 141 generates a "base pattern", based on a provisional pattern based on a maximum set radius and a differential pattern. The base pattern is a sampling pattern being a base when a sampling pattern generating unit 241 of the noise removal unit 24 described later generates a sampling pattern. Further, the detailed pattern generating unit 141 generates a "detailed pattern", based on a differential pattern and a reference value of a sample number in each line. The detailed pattern is a sampling pattern being used when the sampling pattern generating unit 241 generates a sampling pattern. The detailed pattern generating unit 141 stores the base pattern and the detailed pattern in the sampling pattern storage unit 30.

The sampling pattern storage unit 30 stores the base pattern and the detailed pattern.

Figure 13:
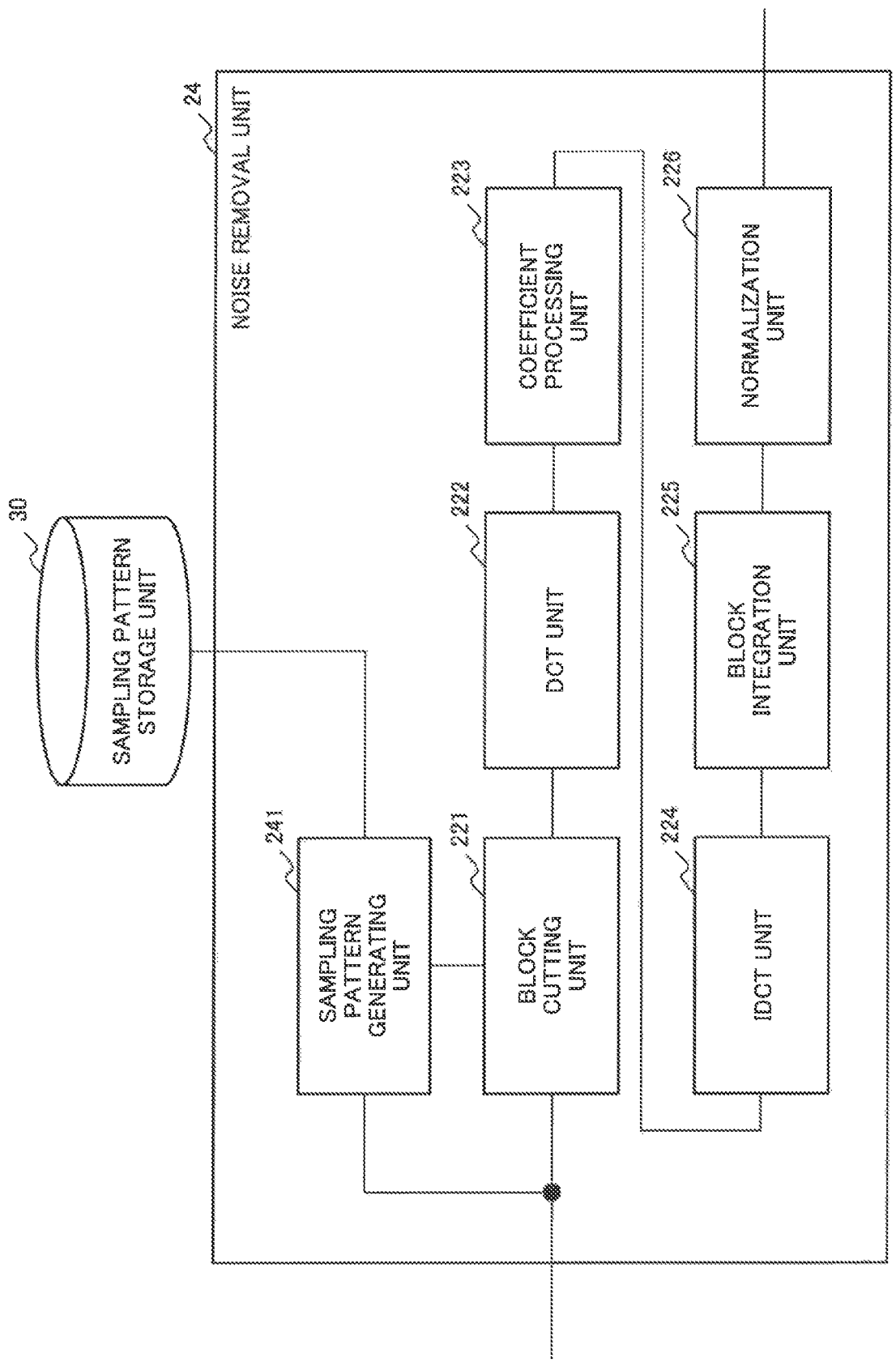
FIG. 13 is a block diagram illustrating a configuration of a noise removal unit in the second example embodiment.

FIG. 13 is a block diagram illustrating a configuration of the noise removal unit 24. The noise removal unit 24 includes a block cutting unit 221, a DCT unit 222, a coefficient processing unit 223, an IDCT unit 224, a block integration unit 225, and a normalization unit 226, similarly to the noise removal unit 22. The noise removal unit 24 further includes the sampling pattern generating unit.

The sampling pattern generating unit 241 generates a sampling pattern, based on a base pattern and a detailed pattern received from the sampling pattern storage unit 30 and statistical information (described later) about a pixel value in a predetermined range of an input image, based on a sampling point. Then, the sampling pattern generating unit 241 outputs the generated sampling pattern to the block cutting unit 221.

Hereinafter, details of processing of the detailed pattern generating unit 141 and the sampling pattern generating unit 241 will be described.

[Detailed Pattern Generating Unit 141]

The detailed pattern generating unit 141 calculates a sample number $n_{p\_0}(j)$ in each line j in a provisional pattern $p_0$ based on a maximum set radius and a sample number $n_{d\_i}(j)$ in each line j of each differential pattern $d_i$, similarly to the determination pattern generating unit 123 in the first example embodiment.

Further, the detailed pattern generating unit 141 makes an error judgment, similarly to the determination pattern generating unit 123.

Further, the detailed pattern generating unit 141 calculates redundancy $n_{red}(x, y)$ of each pixel when a DCT block pattern set based on the provisional pattern $p_0$ is used, similarly to the determination pattern generating unit 123.

Then, the detailed pattern generating unit 141 generates a base pattern $b(x, y)$ and a detailed pattern $h(x, y)$ as follows, based on the provisional pattern $p_0$ based on the maximum set radius, m−1 number of differential patterns $d_0, d_1, \ldots, d_{m-2}$ received from the differential pattern storage unit 125, a block size $t_{DCT}$ of the DCT received from the parameter acquisition unit 11, and a reference value $n_{max}$ of a sample number per one line.

First, the detailed pattern generating unit 141 sets $b(x, y)=p_0(x, y)$ as an initial value of the base pattern $b(x, y)$. Furthermore, the detailed pattern generating unit 141 initializes a sample number $n_b(j)$ in each line of the base pattern $b(x, y)$ as $n_b(j)=n_{p\_0}(j)$.

The detailed pattern generating unit 141 generates the base pattern $b(x, y)$ by adding a sampling point in the base pattern $b(x, y)$ until a pixel having redundancy $n_{red}$ of "0" is not present.

Specifically, the detailed pattern generating unit 141 first checks whether a pixel that $n_{red}(x, y)=0$ is present for the redundancy $n_{red}$. When the pixel that $n_{red}(x, y)=0$ is present, the detailed pattern generating unit 141 updates $b(x, y)$ in such a way that $n_{red}(x, y)>0$ for all pixels.

For example, the detailed pattern generating unit 141 focuses on a line j having the smallest sample number in each line, and adds a pixel position (s, t) that $d_{i(y)}(s, t)=1$ in i(y) in such a way that $n_{d\_i(y)}(j)>0$, as a sampling point in the base pattern $b(x, y)$. In other words, the detailed pattern generating unit 141 changes a value of $b(s, t)$ to "1". Note that the detailed pattern generating unit 141 may specify i(y) by adding 1 to i(y) until $n_{d\_i(y)}(y)>0$ with 0 as an initial value, for example.

With the addition of b(s, t), the detailed pattern generating unit 141 updates $n_{red}$ and $n_b(j)$ in the line j, based on the added point (s, t).

Further, the detailed pattern generating unit 141 excludes the added sampling point (s, t) from $d_{i(y)}(x, y)$. In other words, the detailed pattern generating unit 141 sets $d_{i(y)}(s, t)=0$, and reduces a value of the sample number $n_{d\_i(y)}(j)$ in the line j in $d_{i(y)}$ by the number of added sampling points.

The detailed pattern generating unit 141 repeats the processing of adding a sampling point as described above until a pixel that $n_{red}(x, y)=0$ is not present.

In a case where a line that $n_b(y)>n_{max}$ appears in the process of updating b(x, y) even though a pixel that $n_{red}(x, y)=0$ remains, the detailed pattern generating unit 141 outputs a third error code indicating that a determination pattern cannot be generated to the output control unit 13. In this case, it is conceivable that $n_{max}$ is too small, a maximum set radius $r_{max}$ is too small, or a step width $r_{step}$ of the set radius is too great. The output control unit 13 may perform control in such a way as to display a message for a user to set greater $n_{max}$ or $r_{max}$ or set smaller $r_{step}$.

At a point in time when a pixel that $n_{red}(x, y)=0$ is not present, the detailed pattern generating unit 141 completes the generation of the base pattern b(x, y).

Further, the detailed pattern generating unit 141 generates the detailed pattern h(x, y). First, the detailed pattern generating unit 141 sets h(x, y), and sets (initializes) all values of all h(x, y) to "0". Next, the detailed pattern generating unit 141 specifies minimum $i_{target}$ that satisfies $n_b(j)+\Sigma_i n_{di}(j) \geq n_{max}$ in the line j. Then, the detailed pattern generating unit 141 generates the detailed pattern h(x, j) in the line j by the following equation.

$$h(x,j)=\Sigma_{i=0}^{i_{target}} d_i(x,j) \quad \text{[Equation 7]}$$

The detailed pattern generating unit 141 performs the processing described above on all lines. When the processing described above is performed on all lines, the detailed pattern h(x, y) is completed.

[Sampling Pattern Generating Unit 241]

The sampling pattern generating unit 241 updates the base pattern b(x, y) received from the sampling pattern storage unit 30, based on the detailed pattern h(x, y) and a pixel value u(x, y) of an input image, and generates a sampling pattern p(x, y) adapted to a characteristic of the input image as the result.

First, the sampling pattern generating unit 241 calculates a sample number $n_b(j)$ in the line j of the base pattern b(x, y), and obtains a sample number $n_s(j)=n_{max}-n_b(j)$ needed to be extracted from the detailed pattern in the line.

Next, the sampling pattern generating unit 241 prepares the sampling pattern p(x, y), and sets the base pattern b(x, y) as an initial value of p(x, y) (p(x, y)=b(x, y)).

Next, the sampling pattern generating unit 241 performs local analysis processing of a pixel value on a point that h(x, y)=1 for the detailed pattern h(x, y). In other words, the sampling pattern generating unit 241 calculates statistical information about a pixel value in a predetermined range of an input image, based on a sampling point. For example, the sampling pattern generating unit 241 calculates a local variance v(x, y) of the pixel value u(x, y) represented by the following equation.

$$a(x, y) = \frac{1}{t_{DCT}^2} \sum_{y'=y}^{y+t_{DCT}-1} \sum_{x'=x}^{x+t_{DCT}-1} u(x', y') \quad \text{[Equation 8]}$$

$$v(x, y) = \frac{1}{t_{DCT}^2} \sum_{y'=y}^{y+t_{DCT}-1} \sum_{x'=x}^{x+t_{DCT}-1} (u(x', y') - a(x, y))^2$$

Note that a local variance of a pixel value is generally calculated by using a pixel belonging to a predetermined range with a target pixel as a center. However, the sampling pattern generating unit 241 calculates a variance by using a pixel belonging to a range of an image region processed by the RDCT, as in the equation above. In this way, the sampling pattern generating unit 241 can extract a sampling point, based on the variance of the pixel value in the range of the image region processed by the RDCT, in extracting a sampling point described next.

The sampling pattern generating unit 241 extracts $n_s(j)$ number of pixels from the detailed pattern h(x, y) in decreasing order of local variance value in the line j, and adds the extracted pixel as a sampling point (changes p(x, y) to "1").

The sampling pattern generating unit 241 performs the processing on all lines, and thus the sampling pattern p(x, y) having all lines equal in sample number is generated.

<Operation>

Figure 14:
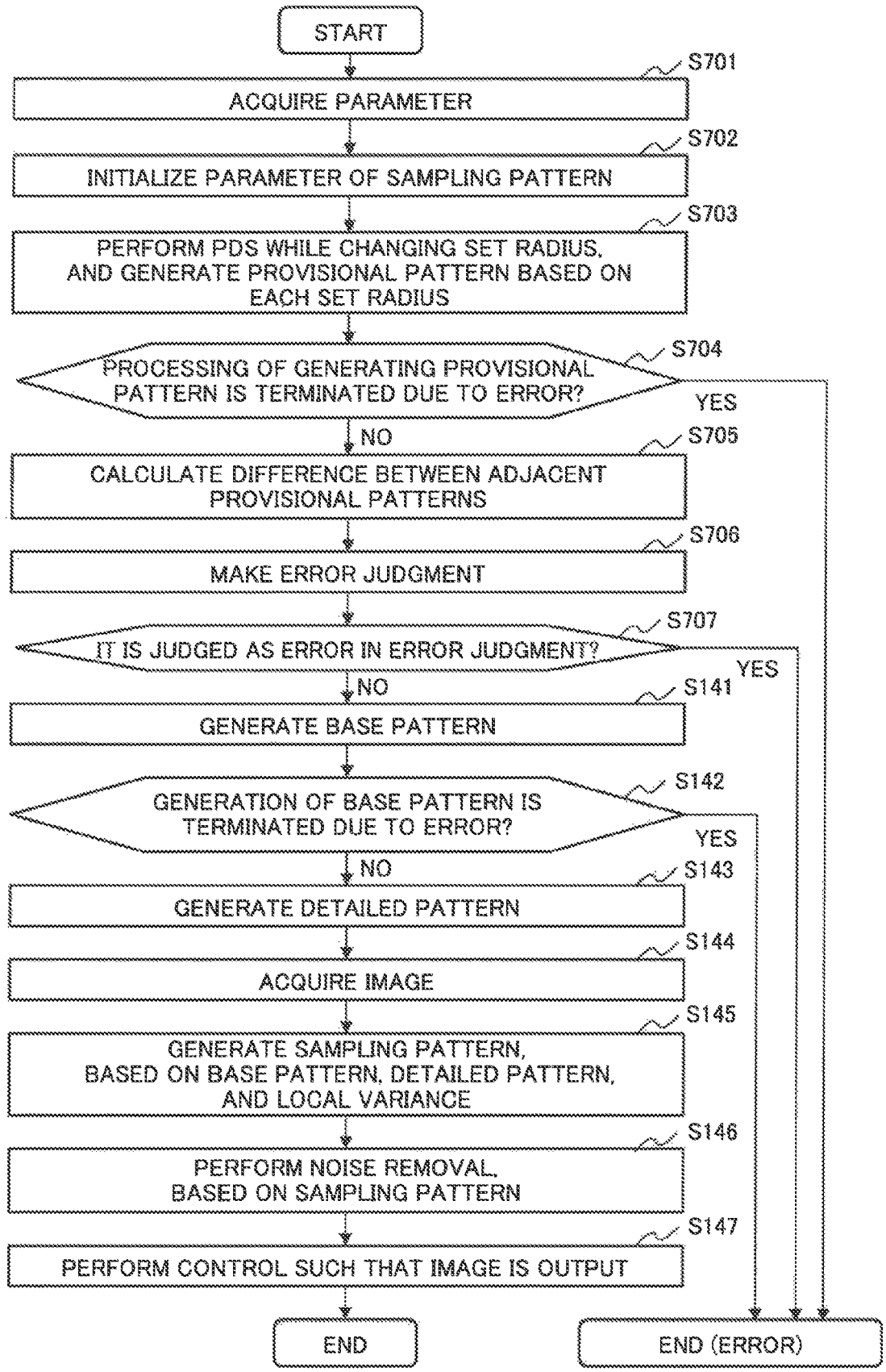
FIG. 14 is a flowchart illustrating an example of an operation of image processing by the image processing device in the second example embodiment.

An image processing method according to the second example embodiment will be described. FIG. 14 is a flowchart illustrating an example of a flow of processing of the image processing device 2.

The processing in Steps S701 to S707 is the same as that in the first example embodiment, so that description thereof will be omitted. Note that the error judgment in Step S707 may be made by, for example, the detailed pattern generating unit 141.

Subsequent to Step S707, the detailed pattern generating unit 141 generates a base pattern (Step S141).

When the generation of the base pattern in Step S141 is terminated due to an error (YES in Step S142), the image processing device 2 terminates the processing as an error.

When the generation of the base pattern in Step S141 is successful (NO in Step S142), the detailed pattern generating unit 141 generates a detailed pattern (Step S143).

Next, the image acquisition unit 21 acquires an image to be a target on which the noise removal processing is performed (Step S144).

Next, the sampling pattern generating unit 241 generates a sampling pattern, based on the base pattern, the detailed pattern, and the local variance (Step S145).

Then, the noise removal unit 22 performs noise removal by the RRDCT on the input image acquired in Step S144, based on the sampling pattern generated in Step S145 (Step S146).

Next, the image output control unit 23 performs control in such a way as to output the image after the noise removal generated in Step S146 (Step S147).

By the flow of the processing as described above, the image processing device 2 outputs the image on which the noise removal is performed based on the sampling pattern (determination pattern) in which the sample number in each row is equal to the reference value.

[Processing of Generating Base Pattern]

Figure 15:
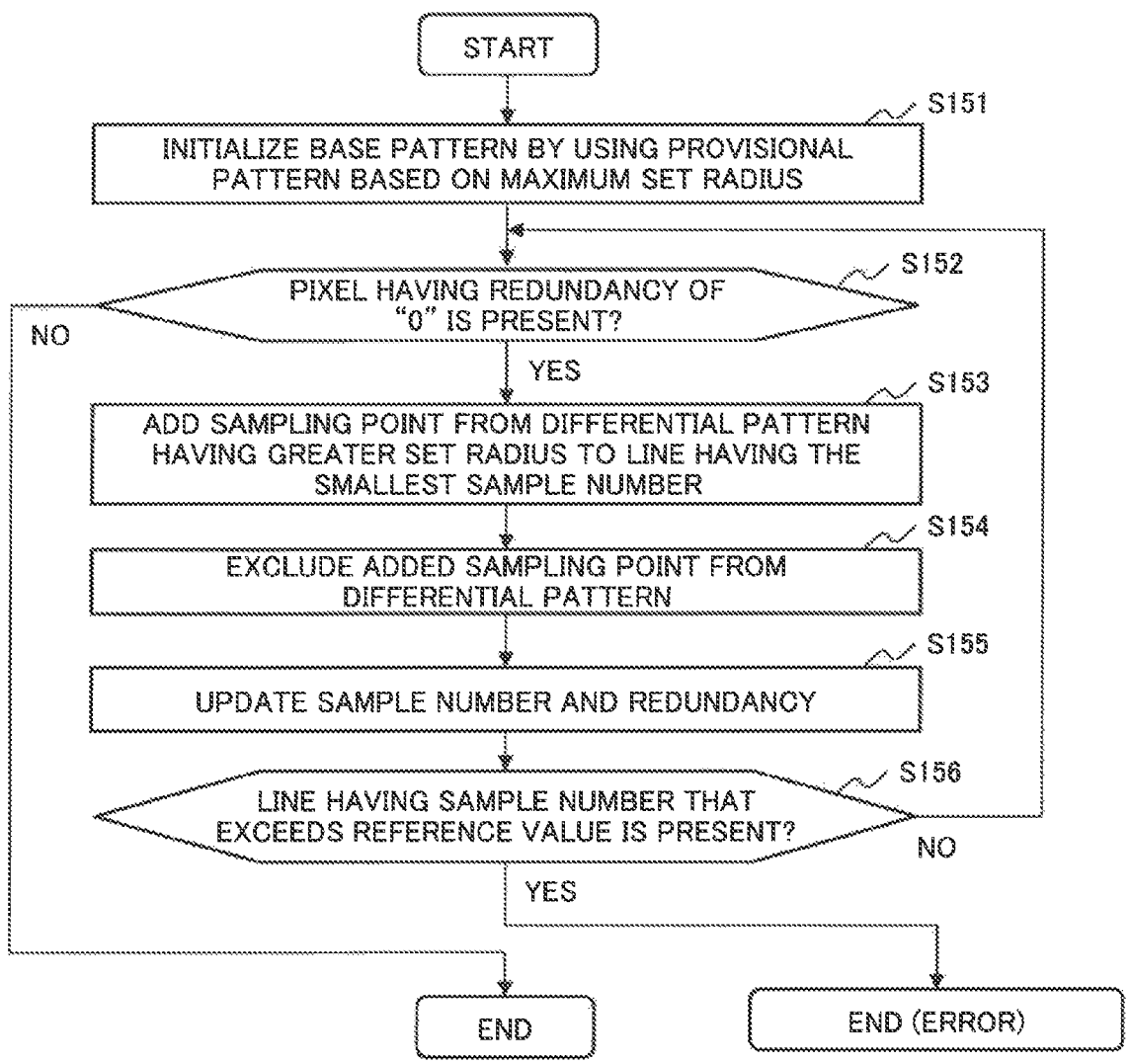
FIG. 15 is a flowchart exemplifying a flow of processing of generating a base pattern.

FIG. 15 is a flowchart illustrating an example of a flow of processing of generating a base pattern by the detailed pattern generating unit 141.

The detailed pattern generating unit 141 first initializes a base pattern by using a provisional pattern based on a maximum set radius (Step S151).

Next, the detailed pattern generating unit 141 checks redundancy of each pixel. When a pixel having redundancy of "0" is present (YES in Step S152), the detailed pattern generating unit 141 performs processing from Step S153 to Step S156. At a point in time when a pixel having redundancy of "0" is not present (NO in Step S152), the detailed pattern generating unit 141 completes the generation of the base pattern.

In Step S153, the detailed pattern generating unit 141 adds a sampling point to a line having the smallest sample number. The detailed pattern generating unit 141 extracts the sampling point from a differential pattern having the greatest set radius among differential patterns having a sampling point in the line, for example. Then, the detailed pattern generating unit 141 excludes the added sampling point from the differential pattern (Step S154). Further, the detailed pattern generating unit 141 updates the sample number and the redundancy (Step S155).

Then, the detailed pattern generating unit 141 judges whether a line having a sample number that exceeds a reference value is present (Step S156). When a line having a sample number that exceeds the reference value is present (YES in Step S156), the detailed pattern generating unit 141 outputs an error and terminates the processing. When a line having a sample number that exceeds the reference value is not present (NO in Step S156), the processing returns to the processing in Step S152, and the detailed pattern generating unit 141 performs the similar processing until a pixel having redundancy of "0" is not present.

<Effect>

An effect of the image processing device 2 according to the second example embodiment will be described. The image processing device 2 has an effect of being capable of being identical throughput for each line, similarly to the first example embodiment. Furthermore, a sampling pattern generated by the sampling pattern generating unit 241 of the image processing device 2 is generated in such a way as to be adapted to an input image according to the input image, and thus an effect of further improving image quality of an output image after noise removal can be achieved. Since the RDCT generally suppresses occurrence of mosquito noise by redundant addition of many blocks in a region having a great local variance such as an edge and a texture, there is a problem that the mosquito noise is more likely to be conspicuous when the number of blocks around the edge and the texture is reduced by the RRDCT. According to the image processing device 2, a sampling point is more likely to be assigned to a region having a great local variance, and thus a sampling pattern is adapted to a local variance of an input image, and occurrence of mosquito noise is more likely to be suppressed.

Modification Example 1

A function of the image processing device in each of the example embodiments described above may not be achieved by one device. For example, as illustrated in FIG. 16, a function of the image processing device 1 in the first example embodiment may be achieved by a pattern generation device 100 and an image processing device 200.

Figure 16:
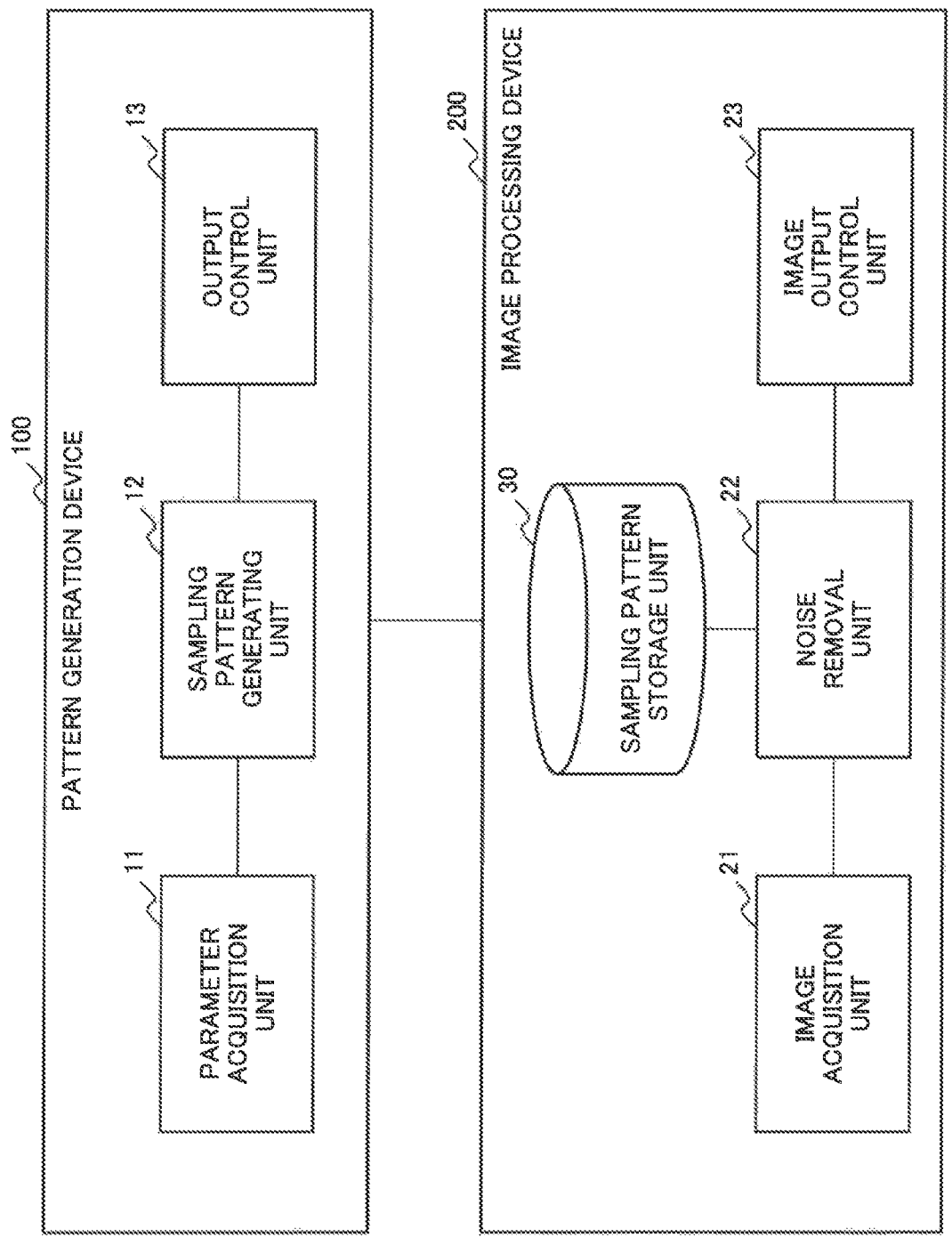
FIG. 16 is a block diagram illustrating a modification example of a configuration of the image processing device in the first example embodiment.

In the example illustrated in FIG. 16, the pattern generation device 100 includes a parameter acquisition unit 11, a sampling pattern generating unit 12, and an output control unit 13. The image processing device 200 includes a sampling pattern storage unit 30, an image acquisition unit 21, a noise removal unit 22, and an image output control unit 23.

The sampling pattern generating unit 12 may output a generated provisional pattern, a generated differential pattern, and the like to the sampling pattern storage unit 30 of the image processing device 200. The output control unit 13 may output a provisional pattern, a differential pattern, and the like to the sampling pattern storage unit 30. The pattern generation device 100 and the image processing device 200 should be connected communicably to each other. The pattern generation device 100 and the image processing device 200 may be connected with any of a wireless network, a wired network, and a circuit.

A configuration of the image processing device 2 in the second example embodiment can also be changed to a similar configuration.

A function of the image processing device in each of the example embodiments may be achieved by a combination of a plurality of devices further minutely assigned with functions.

Modification Example 2

The image processing device described above in each of the example embodiments generates a sampling pattern in which a sample number in each line is equal to a reference value by adding a sampling point to a predetermined sampling pattern. As a modification example, an example in which the image processing device generates a final sampling pattern by a method other than the example above is described.

Hereinafter, as the modification example, an example in which the sampling pattern generating unit 12 of the image processing device 1 according to the first example embodiment generates a sampling pattern by a method other than the method described above is described. Note that, in the present modification example, the sampling pattern generating unit 12 may not necessarily include all the configurations as illustrated in FIG. 2.

(Method 1)

The sampling pattern generating unit 12 may generate a sampling pattern in such a way that a sample number in each line becomes a reference value by deleting a sampling point in each line from a provisional pattern $p_{m-2}$.

The sampling pattern generating unit 12 may determine a sampling point to be deleted in order from a sampling point definitized by the PDS based on a smaller set radius.

The sampling pattern generating unit 12 may preferentially delete a sampling point having a greater redundant density.

According to the method described above, a sampling pattern in which variations in redundancy are small and a sample number in each line is equal is generated, similarly to the first example embodiment.

(Method 2)

The sampling pattern generating unit 12 may generate only a sampling pattern corresponding to $p_{m-2}$ as a provisional pattern. Then, the sampling pattern generating unit 12 may generate a sampling pattern in such a way that a sample number in each line becomes a reference value by deleting a sampling point in each line from the provisional pattern $p_{m-2}$. In this case, the sampling pattern generating unit 12 may determine a sampling point to be deleted, based on a redundant density of each sampling point. In other words, the sampling pattern generating unit 12 may delete a sampling point in decreasing order of redundant density.

(Method 3)

The sampling pattern generating unit 12 may generate a sampling pattern by the following procedure without performing the PDS.

Step S1: Select a point in number equal to a reference value in each line, for example, randomly as a temporary sampling point.

Step S2: Perform correction in such a way as to move the temporary sampling point in a direction of the line in such a way that a pixel having redundancy of "0" is eliminated.

The redundancy in Step S2 is the number of blocks including the pixel when a block is generated, based on the temporary sampling point.

In Step S2, the sampling pattern generating unit 12 specifies a pixel having redundancy of "0", for example. Then, the sampling pattern generating unit 12 moves at least any one of temporary sampling points located in a line including the pixel or a line above the line at a distance within a $t_{DCT}$ row from the line, in a line direction to the vicinity of a point having redundancy of "0". The vicinity represents a position of a point that may be a sampling point of a block that includes the point having redundancy of "0".

The sampling pattern generating unit 12 may calculate a redundant density of each temporary sampling point, and move a temporary sampling point having the greatest redundant density.

Further, the sampling pattern generating unit 12 may set a range of redundancy, and move a temporary sampling point in such a way as to eliminate a pixel position having redundancy that falls outside the range.

By the method described above, the sampling pattern generating unit 12 can also generate a sampling pattern in which variations in redundancy are small and a sample number in each line is equal.

The method described above is an example. A person skilled in the art can make various modifications for the method of generating a sampling pattern in which a sample number in each line is equal.

<<Main Configuration>>

Figure 17:
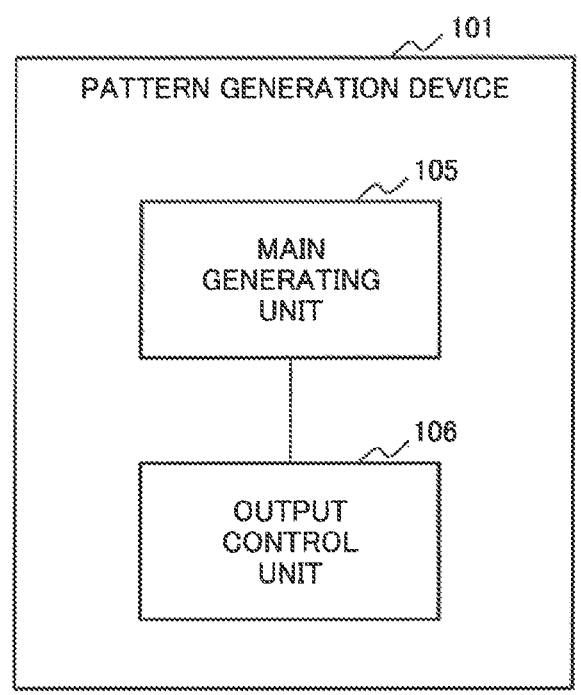
FIG. 17 is a block diagram illustrating a configuration of a pattern generation device according to one example embodiment of the present invention.

A pattern generation device 101 according to one example embodiment of the present invention will be described. FIG. 17 is a block diagram illustrating a configuration of the pattern generation device 101. The pattern generation device 101 includes a main generating unit 105 and an output control unit 106.

The main generating unit 105 generates a sampling pattern in such a way that the number of sampling points in a plurality of rows in the sampling pattern is equal to a reference value. The sampling pattern is a pattern of a position of the sampling point in an image. The sampling point is a point indicating a position of a block used in image processing for each block.

The determination pattern generating unit 123 and the sampling pattern generating unit 241 in each of the example embodiments described above and the sampling pattern generating unit 12 in the modification example are one example of the main generating unit 105.

Hereinafter, a sampling pattern generated by the main generating unit 105 is also referred to as a "main sampling pattern". A "determination pattern" and a sampling pattern generated by the sampling pattern generating unit 241 in each of the example embodiments described above and a sampling pattern generated by the sampling pattern generating unit 12 in the modification example are an example of the main sampling pattern.

The output control unit 106 performs control in such a way as to output a main sampling pattern. Specifically, for example, the output control unit 106 sends data about the main sampling pattern to a display device or the image processing device, sends the data about the main sampling pattern to a communication network, or writes the data about the main sampling pattern to a storage medium. The output control unit 106 may perform two or more of any of the output control described above.

The output control unit 13, the determination pattern generating unit 123, the sampling pattern storage unit 30, and the sampling pattern generating unit 241 in each of the example embodiments described above are one example of the output control unit 106.

Figure 18:
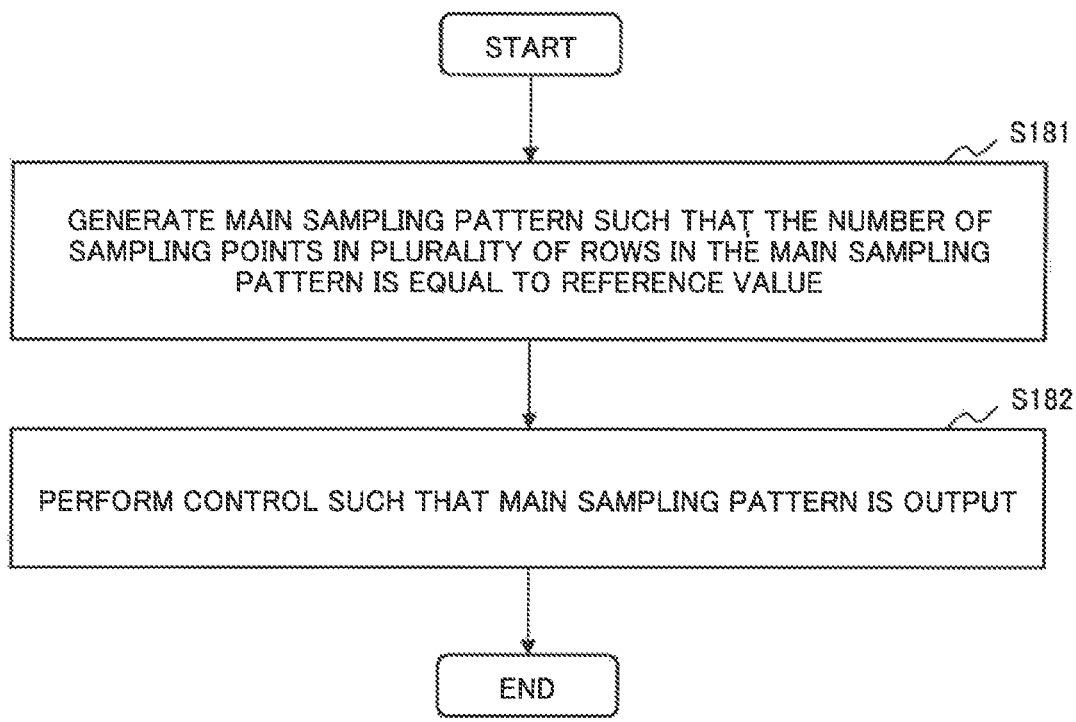
FIG. 18 is a block diagram illustrating a flow of a pattern generation method according to one example embodiment of the present invention.

A flow of an operation of the pattern generation device 101 will be described with reference to a flowchart of FIG. 18. First, the main generating unit 105 generates a main sampling pattern in such a way that the number of sampling points in a plurality of rows in the main sampling pattern is equal to a reference value (Step S181). Then, the output control unit 106 performs control in such a way as to output the main sampling pattern (Step S182).

According to the pattern generation device 101, a sampling pattern that may improve efficiency of image processing including processing on a sampled block can be acquired. The reason is that the main generating unit 105 generates a sampling pattern in which a plurality of lines are equal in sample number, and the output control unit 106 performs output control of the sampling pattern. Particularly, when the main generating unit 105 generates a sampling pattern in which all lines are equal in sample number, a bias of the processing in each line is suppressed in the image processing, and thus the efficiency of the image processing is improved.

Figure 19:
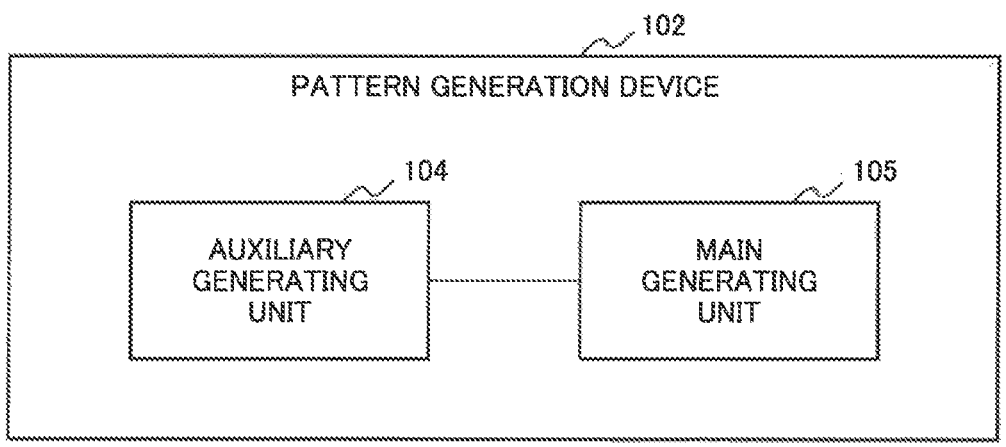
FIG. 19 is a block diagram illustrating a configuration of a pattern generation device according to one example embodiment of the present invention.

Note that the pattern generation device may include an auxiliary generating unit 104 as in FIG. 19. FIG. 19 is a block diagram illustrating a configuration of a pattern generation device 102 including the auxiliary generating unit 104.

The auxiliary generating unit 104 generates a first sampling pattern and a second sampling pattern generated by further adding a sampling point to the first sampling pattern. The PDS performing unit 121 and the detailed pattern generating unit 141 in each of the example embodiments described above are one example of the auxiliary generating unit 104. Provisional patterns $p_0, \ldots,$ and $p_{m-2}$ and a base pattern are an example of the first sampling pattern. Provisional patterns $p_i, \ldots,$ and $p_{m-1}$ are an example of the second sampling pattern.

The main generating unit 105 generates a main sampling pattern by specifying a row in which the number of sampling points falls below the reference value in the first sampling pattern, and adding a sampling point included in the second sampling pattern to the first sampling pattern in such a way that the number of sampling points in the row is equal to the reference value.

In this way, it is expected that a sampling pattern with smaller variations in redundancy, namely, without a bias of a sampling point is generated.

<<Configuration of Hardware that Achieves Each Unit of Example Embodiment>>

Each of components of each of devices illustrates a block of functional units in each of the example embodiments of the present invention described above.

The processing of each of the components may be achieved by, for example, a computer system reading and executing a program that is stored in a computer-readable storage medium and causes the computer system to perform the processing. The "computer-readable storage medium" is, for example, a portable medium such as an optical disk, a magnetic disk, a magneto-optical disk, and a non-volatile semiconductor memory, and a storage device such as a read only memory (ROM) built in the computer system and a hard disk. The "computer-readable storage medium" also includes a computer-readable storage medium that dynamically holds a program for a short period of time, such as a communication line that transmits a program via a network such as the Internet and a communication line such as a telephone line, and a computer-readable storage medium that temporarily holds a program, such as a volatile memory inside the computer system corresponding to a server and a client in this case. Further, the above-described program may achieve a part of the above-mentioned function, and may further achieve the above-mentioned function by a combination with a program already stored in the computer system.

Figure 20:
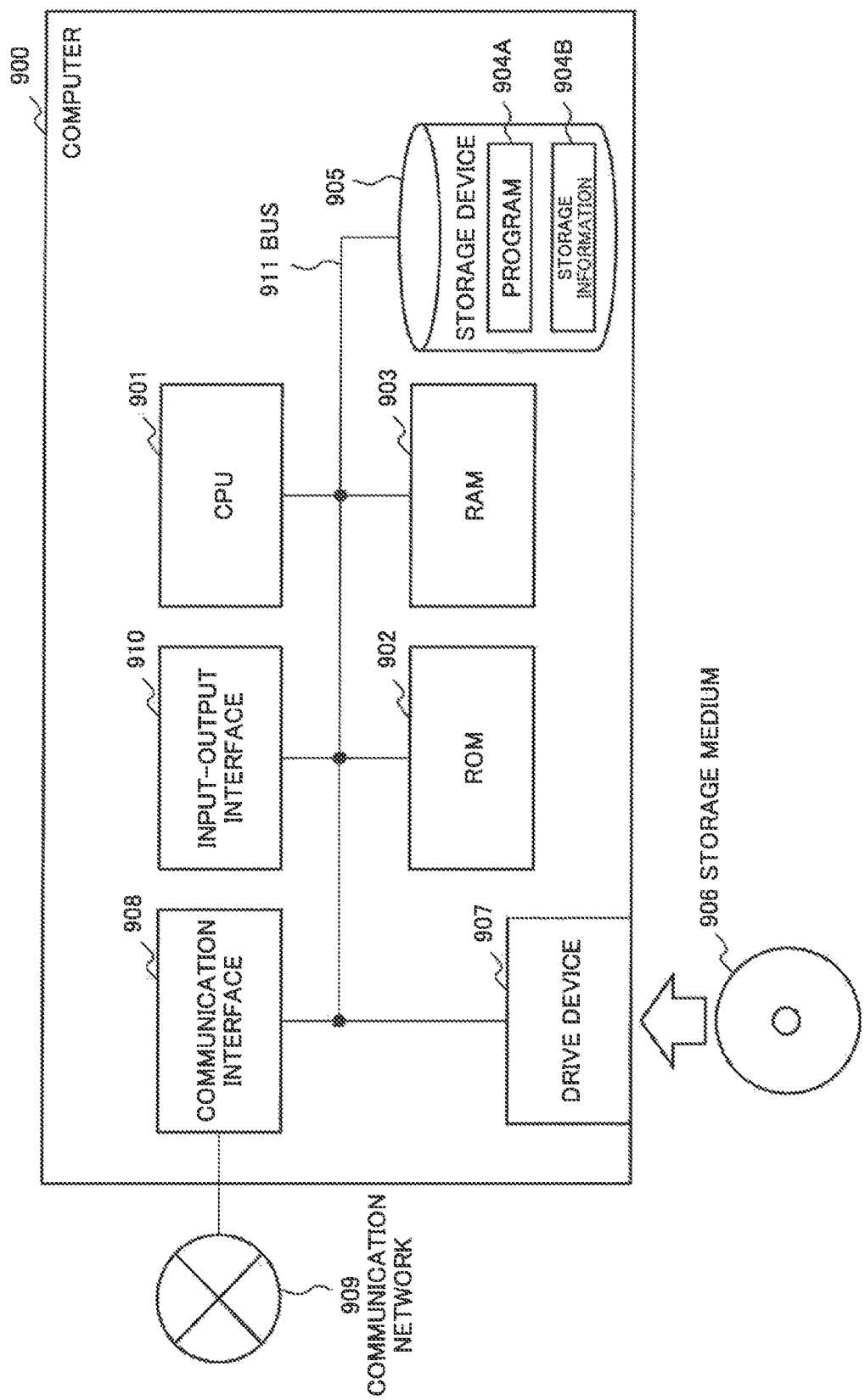
FIG. 20 is a block diagram illustrating an example of hardware constituting each unit of each of the example embodiments of the present invention.

The "computer system" is a system including a computer 900 as illustrated in FIG. 20 as one example. The computer 900 includes the following configuration.

A central processing unit (CPU) 901
A ROM 902
A random access memory (RAM) 903
A program 904A and storage information 904B loaded into the RAM 903
A storage device 905 that stores the program 904A and the storage information 904B
A drive device 907 that reads and writes a storage medium 906
A communication interface 908 connected to a communication network 909
An input-output interface 910 that inputs and outputs data
A bus 911 that connects components For example, each of the components of each of the devices in each of the example embodiments is achieved by the CPU 901 loading the program 904A that achieves a function of the component into the RAM 903 and executing the program 904A. The program 904A that achieves a function of each of the components of each of the devices is previously stored in the storage device 905 and the ROM 902, for example. Then, the CPU 901 reads the program 904A as necessary. The storage device 905 is, for example, a hard disk. The program 904A may be supplied to the CPU 901 via the communication network 909, or may be previously stored in the storage medium 906 and read by the drive device 907 to be supplied to the CPU 901. Note that, the storage medium 906 is, for example, a portable medium such as an optical disk, a magnetic disk, a magneto-optical disk, and a non-volatile semiconductor memory.

A method of achieving each of the devices has various modification examples. For example, each of the devices may be achieved by a possible combination of each separate computer 900 and a program for each component. Alternatively, a plurality of components provided in each of the devices may be achieved by a possible combination of one information processing device 900 and a program.

A part or the whole of each of the components of each of the devices may be achieved by another general-purpose or dedicated circuit, a computer, and the like, or achieved by a combination thereof. The circuit, the computer, and the like may be formed by a single chip or formed by a plurality of chips connected to one another via a bus.

When a part or the whole of each of the components of each of the devices is achieved by a plurality of computers, circuits, or the like, the plurality of computers, circuits, or the like may be arranged in a concentrated manner or a distributed manner. For example, the computer, the circuit, and the like may be achieved as a form in which each is connected via a communication network, such as a client and server system or a cloud computing system.

The claimed invention is not limited to the example embodiments described above. Various modifications that can be understood by those skilled in the art within the scope of the claimed invention may be applied to the configuration and the details of the claimed invention.

A part or the whole of the above-described example embodiments may also be described in supplementary notes below, which is not limited thereto.

≤≤Supplementary Notes≥≥

[Supplementary Note 1]

A pattern generation device, including:

a main generating means for generating a sampling pattern being a pattern of a position in an image of a sampling point indicating a block used in image processing for each block in such a way that a number of sampling points in a plurality of rows in the sampling pattern is each equal to a reference value; and an output control means for performing control in such a way as to output a main sampling pattern being a sampling pattern generated by the main generating means.

[Supplementary Note 2]

The pattern generation device according to supplementary note 1, wherein the main generating means generates the main sampling pattern in such a way that a number of sampling points in every row is equal to the reference value.

[Supplementary Note 3]

The pattern generation device according to supplementary note 1 or 2, further including an auxiliary generating means for generating a first sampling pattern and a second sampling pattern to be generated by further adding a sampling point to the first sampling pattern, wherein the main generating means generates the main sampling pattern by specifying a row in which a number of sampling points falls below the reference value in the first sampling pattern, and adding a sampling point included in the second sampling pattern to the first sampling pattern in such a way that a number of sampling points in the row is equal to the reference value.

[Supplementary Note 4]

The pattern generation device according to supplementary note 3, wherein the auxiliary generating means generates a plurality of sampling patterns as the second sampling pattern by gradually adding a sampling point to the first sampling pattern, and the main generating means adds a sampling point, to the first sampling pattern, in order from a sampling point included in a sampling pattern generated at an earlier stage among sampling points included in the plurality of sampling patterns.

[Supplementary Note 5]

The pattern generation device according to supplementary note 4, wherein the auxiliary generating means reduces a set value according to progress of a stage, and generates the plurality of sampling patterns in such a way that sampling points are located at a distance of greater than or equal to the set value from each other.

[Supplementary Note 6]

The pattern generation device according to any one of supplementary notes 3 to 5, wherein the main generating means calculates, for each position in the first sampling pattern, redundancy being a number of the blocks including the position, based on each position of the block specified based on the first sampling pattern, and determines a sampling point to be added, based on the redundancy.

[Supplementary Note 7]

The pattern generation device according to any one of supplementary notes 3 to 6, wherein the main generating means determines, from a sampling point included in the second sampling pattern, a sampling point to be added, based on statistical information about a pixel value in a predetermined range based on the sampling point in an image on which the image processing is performed.

[Supplementary Note 8]

The pattern generation device according to any one of supplementary notes 1 to 7, wherein the output control means performs control in such a way as to output information indicating an error when a pixel that is not included in any of the blocks specified based on the main sampling pattern is present.

[Supplementary Note 9]

An image processing device, including an image processing means for receiving, from the output control means, the main sampling pattern generated by the pattern generation device according to any one of supplementary notes 1 to 8, and generating a new image by performing image processing for each of the blocks based on the main sampling pattern.

[Supplementary Note 10]

The image processing device according to supplementary note 9, further including:

a frequency transform means for calculating a transform coefficient by applying predetermined frequency transform to each of the blocks specified based on the main sampling pattern;

a coefficient processing means for calculating a new transform coefficient by performing correction in such a way as to change the transform coefficient that does not satisfy a predetermined threshold value to zero;

an inverse frequency transform means for generating an image block by applying inverse transform of the frequency transform to each of the new transform coefficients; and an integration means for generating an image by integrating the image block.

[Supplementary Note 11]

A pattern generation method, including:

generating a sampling pattern being a pattern of a position in an image of a sampling point indicating a block used in image processing for each block in such a way that a number of sampling points in a plurality of rows in the sampling pattern is each equal to a reference value; and performing control in such a way as to output a main sampling pattern being the generated sampling pattern.

[Supplementary Note 12]

The pattern generation method according to supplementary note 11, further including generating the main sampling pattern in such a way that a number of sampling points in every row is equal to the reference value.

[Supplementary Note 13]

The pattern generation method according to supplementary note 11 or 12, further including:

generating a first sampling pattern and a second sampling pattern to be generated by further adding a sampling point to the first sampling pattern; and generating the main sampling pattern by specifying a row in which a number of sampling points falls below the reference value in the first sampling pattern, and by adding a sampling point included in the second sampling pattern to the first sampling pattern in such a way that a number of sampling points in the row is equal to the reference value.

[Supplementary Note 14]

The pattern generation method according to supplementary note 13, further including:

generating a plurality of sampling patterns as the second sampling pattern by gradually adding a sampling point to the first sampling pattern; and adding, in generation of the main sampling pattern, a sampling point, to the first sampling pattern, in order from a sampling point included in a sampling pattern generated at an earlier stage among sampling points included in the plurality of sampling patterns.

[Supplementary Note 15]

The pattern generation method according to supplementary note 14, further including reducing, in generation of the plurality of sampling patterns, a set value according to progress of a stage, and generating the plurality of sampling patterns in such a way that sampling points are located at a distance of greater than or equal to the set value from each other.

[Supplementary Note 16]

The pattern generation method according to any one of supplementary notes 13 to 15, further including calculating in generation of the main sampling pattern, for each position in the first sampling pattern, redundancy being a number of the blocks including the position, based on each position of the block specified based on the first sampling pattern, and determining a sampling point to be added based on the redundancy.

[Supplementary Note 17]

The pattern generation method according to any one of supplementary notes 13 to 16, further including determining, in generation of the main sampling pattern, a sampling point to be added, from a sampling point included in the second sampling pattern, based on statistical information about a pixel value in a predetermined range based on the sampling point in an image on which the image processing is performed.

[Supplementary Note 18]

The pattern generation method according to any one of supplementary notes 11 to 17, further including performing control in such a way as to output information indicating an error when a pixel that is not included in any of the blocks specified based on the main sampling pattern is present.

[Supplementary Note 19]

An image processing method, including receiving the main sampling pattern generated by the pattern generation method according to any one of supplementary notes 11 to 18, and generating a new image by performing image processing for each of the blocks based on the main sampling pattern.

[Supplementary Note 20]

The image processing method according to supplementary note 19, further including:

calculating a transform coefficient by applying predetermined frequency transform to each of the blocks specified based on the main sampling pattern;

calculating a new transform coefficient by performing correction in such a way as to change the transform coefficient that does not satisfy a predetermined threshold value to zero;

generating an image block by applying inverse transform of the frequency transform to each of the new transform coefficients; and generating an image by integrating the image block.

[Supplementary Note 21]

A program causing a computer to execute:

main generating processing of generating a sampling pattern being a pattern of a position in an image of a sampling point indicating a block used in image processing for each block in such a way that a number of sampling points in a plurality of rows in the sampling pattern is each equal to a reference value; and output control processing of performing control in such a way as to output a main sampling pattern being a sampling pattern generated by the main generating processing.

[Supplementary Note 22]

The program according to supplementary note 21, wherein the main generating processing generates the main sampling pattern in such a way that a number of sampling points in every row is equal to the reference value.

[Supplementary Note 23]

The program according to supplementary note 21 or 22 causing a computer to execute auxiliary generating processing of generating a first sampling pattern and a second sampling pattern generated by further adding a sampling point to the first sampling pattern, wherein the main generating processing generates the main sampling pattern by specifying a row in which a number of sampling points falls below the reference value in the first sampling pattern, and adding a sampling point included in the second sampling pattern to the first sampling pattern in such a way that a number of sampling points in the row is equal to the reference value.

[Supplementary Note 24]

The program according to supplementary note 23, wherein the auxiliary generating processing generates a plurality of sampling patterns as the second sampling pattern by gradually adding a sampling point to the first sampling pattern, and the main generating processing adds a sampling point to the first sampling pattern, in order from a sampling point included in a sampling pattern generated at an earlier stage among sampling points included in the plurality of sampling patterns.

[Supplementary Note 25]

The program according to supplementary note 24, wherein the auxiliary generating processing reduces a set value according to progress of a stage, and generates the plurality of sampling patterns in such a way that sampling points are located at a distance of greater than or equal to the set value from each other.

[Supplementary Note 26]

The program according to any one of supplementary notes 23 to 25, wherein the main generating processing calculates, for each position in the first sampling pattern, redundancy being a number of the blocks including the position, based on each position of the block specified based on the first sampling pattern, and determines a sampling point to be added, based on the redundancy.

[Supplementary Note 27]

The program according to any one of supplementary notes 23 to 26, wherein the main generating processing determines, from a sampling point included in the second sampling pattern, a sampling point to be added, based on statistical information about a pixel value in a predetermined range based on the sampling point in an image on which the image processing is performed.

[Supplementary Note 28]

The program according to any one of supplementary notes 21 to 27, wherein the output control processing performs control in such a way as to output information indicating an error when a pixel that is not included in any of the blocks specified based on the main sampling pattern is present.

[Supplementary Note 29]

A program causing a computer to execute:

image process processing of receiving, from the output control means, the main sampling pattern generated by the pattern generation device according to any one of supplementary notes 1 to 8, and generating a new image by performing image processing for each of the blocks based on the main sampling pattern.

[Supplementary Note 30]

The program according to supplementary note 29, wherein the image process processing includes frequency transform processing of calculating a transform coefficient by applying predetermined frequency transform to each of the blocks specified based on the main sampling pattern, coefficient processing of calculating a new transform coefficient by performing correction in such a way as to change the transform coefficient that does not satisfy a predetermined threshold value to zero, inverse frequency transform processing of generating an image block by applying inverse transform of the frequency transform to each of the new transform coefficients, and integration processing of generating an image by integrating the image block.

[Supplementary Note 31]

A computer-readable storage medium storing the program according to any one of supplementary notes 21 to 30.

REFERENCE SIGNS LIST 1 to 3 Image processing device
11 Parameter acquisition unit
12, 14 Sampling pattern generating unit
121 PDS performing unit
122 Differential pattern generating unit
123 Determination pattern generating unit
124 Provisional pattern storage unit
125 Differential pattern storage unit
13 Output control unit
141 Detailed pattern generating unit
21 Image acquisition unit
22, 24 Noise removal unit
221 Block cutting unit
222 DCT unit
223 Coefficient processing unit
224 IDCT unit
225 Block integration unit
226 Normalization unit
23 Image output control unit
241 Sampling pattern generating unit
30 Sampling pattern storage unit
100 to 102 Pattern generation device
104 Auxiliary generating unit
105 Main generating unit
106 Output control unit
200 Image processing device
900 Computer
901 CPU
902 ROM
903 RAM
904A Program
904B Storage information
905 Storage device
906 Storage medium
907 Drive device 908 Communication interface
909 Communication network
910 Input-output interface
911 Bus

What is claimed is:

1. A pattern generation device, comprising:
a main generating unit generating a sampling pattern being a pattern of a position in an image of a sampling point indicating a block used in image processing for each block in such a way that a number of sampling points in a plurality of rows in the sampling pattern is each equal to a reference value;
an output control unit performing control in such a way as to output a main sampling pattern being a sampling pattern generated by the main generating unit; and
an auxiliary generating unit generating a first sampling pattern and a second sampling pattern to be generated by further adding a sampling point to the first sampling pattern, wherein
the main generating unit generates the main sampling pattern by specifying a row in which a number of sampling points falls below the reference value in the first sampling pattern, and adding a sampling point included in the second sampling pattern to the first sampling pattern in such a way that a number of sampling points in the row is equal to the reference value.

2. The pattern generation device according to claim 1, wherein
the main generating unit generates the main sampling pattern in such a way that a number of sampling points in every row is equal to the reference value.

3. The pattern generation device according to claim 1, wherein
the auxiliary generating unit generates a plurality of sampling patterns as the second sampling pattern by gradually adding a sampling point to the first sampling pattern, and
the main generating unit adds a sampling point to the first sampling pattern, in order from a sampling point included in a sampling pattern generated at an earlier stage among sampling points included in the plurality of sampling patterns.

4. The pattern generation device according to claim 3, wherein
the auxiliary generating unit reduces a set value according to progress of a stage, and generates the plurality of sampling patterns in such a way that sampling points are located at a distance of greater than or equal to the set value from each other.

5. The pattern generation device according to claim 1, wherein
the main generating unit calculates, for each position in the first sampling pattern, redundancy being a number of the blocks including the position, based on each position of the block specified based on the first sampling pattern, and determines a sampling point to be added, based on the redundancy.

6. The pattern generation device according to claim 1, wherein
the main generating unit determines, from a sampling point included in the second sampling pattern, a sampling point to be added, based on statistical information about a pixel value in a predetermined range based on the sampling point in an image on which the image processing is performed.

7. The pattern generation device according to claim 1, wherein
the output control unit performs control in such a way as to output information indicating an error when a pixel that is not included in any of the blocks specified based on the main sampling pattern is present.

8. An image processing device, comprising
an image processing unit receiving, from the output control unit, the main sampling pattern generated by the pattern generation device according to claim 1, and generating a new image by performing image processing for each of the blocks based on the main sampling pattern.

9. The image processing device according to claim 8, further comprising:
a frequency transform unit calculating a transform coefficient by applying predetermined frequency transform to each of the blocks specified based on the main sampling pattern;
a coefficient processing unit calculating a new transform coefficient by performing correction in such a way as to change the transform coefficient that does not satisfy a predetermined threshold value to zero;
an inverse frequency transform unit generating an image block by applying inverse transform of the frequency transform to each of the new transform coefficients; and
an integration unit generating an image by integrating the image block.

10. A pattern generation method, comprising:
generating a sampling pattern being a pattern of a position in an image of a sampling point indicating a block used in image processing for each block in such a way that a number of sampling points in a plurality of rows in the sampling pattern is each equal to a reference value; and
performing control in such a way as to output a main sampling pattern being the generated sampling pattern; generating a first sampling pattern and a second sampling pattern to be generated by further adding a sampling point to the first sampling pattern; and
generating the main sampling pattern by specifying a row in which a number of sampling points falls below the reference value in the first sampling pattern, and by adding a sampling point included in the second sampling pattern to the first sampling pattern in such a way that a number of sampling points in the row is equal to the reference value.

11. An image processing method, comprising
receiving the main sampling pattern generated by the pattern generation method according to claim 10, and generating a new image by performing image processing for each of the blocks based on the main sampling pattern.

12. A non-transitory computer-readable storage medium that stores a program causing a computer to execute:
main generating processing of generating a sampling pattern being a pattern of a position in an image of a sampling point indicating a block used in image processing for each block in such a way that a number of sampling points in a plurality of rows in the sampling pattern is each equal to a reference value;
output control processing of performing control in such a way as to output a main sampling pattern being a sampling pattern generated by the main generating processing;
the program causes a computer to execute auxiliary generating processing of generating a first sampling pattern and a second sampling pattern generated by further adding a sampling point to the first sampling pattern, and the main generating processing generates the main sampling pattern by specifying a row in which a number of sampling points falls below the reference value in the first sampling pattern, and adding a sampling point 20 included in the second sampling pattern to the first sampling pattern in such a way that a number of sampling points in the row is equal to the reference value.

\* \* \* \* \*